US012074825B2

(12) United States Patent
Khoshnevisan et al.

(10) Patent No.: US 12,074,825 B2
(45) Date of Patent: *Aug. 27, 2024

(54) ASSIGNMENT INDEXES FOR DYNAMIC FEEDBACK

(71) Applicant: QUALCOMM Incorporated, San Diego, CA (US)

(72) Inventors: Mostafa Khoshnevisan, San Diego, CA (US); Kazuki Takeda, Minato-ku (JP); Huilin Xu, Temecula, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/152,085

(22) Filed: Jan. 9, 2023

(65) Prior Publication Data
US 2023/0163925 A1 May 25, 2023

Related U.S. Application Data

(63) Continuation of application No. 17/148,251, filed on Jan. 13, 2021, now Pat. No. 11,558,166.

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC .... H04L 5/0055; H04L 1/1812; H04L 5/0092
See application file for complete search history.

(56) References Cited

U.S. PATENT DOCUMENTS 11,026,229 B2   6/2021  Kazmi et al.
2022/0210800 A1* 6/2022 Babaei .............. H04L 5/0092
(Continued)

FOREIGN PATENT DOCUMENTS

WO   WO2021142755      7/2021
WO   WO2022086929 A1   4/2022

OTHER PUBLICATIONS

International Search Report and Written Opinion—PCT/US2021/064414—ISA/EPO—dated Apr. 25, 2022.
(Continued)

*Primary Examiner* — Vinncelas Louis
(74) *Attorney, Agent, or Firm* — Holland & Hart LLP/Qualcomm Incorporated

(57) ABSTRACT

Methods, systems, and devices for wireless communications are described. A user equipment (UE) may order assignment indicator values for transmissions for use by feedback information in a feedback message. The UE may receive, during a monitoring occasion, a first control information over a first serving cell and a second control information over a second serving cell, where each control information schedules a respective transmission for a scheduled serving cell. The UE may order assignment indicator values for the transmissions based on indexes associated with the first and second serving cells (e.g., scheduling serving cells), an index associated with the scheduled serving cell, a start time of the transmissions, or some combination thereof, among other examples. The assignment indicator values may be associated with hybrid automatic repeat request acknowledgement (HARQ/ACK) feedback, such that the UE may use the assignment indicator values to construct and transmit a feedback message.

28 Claims, 13 Drawing Sheets

(56) References Cited

U.S. PATENT DOCUMENTS

| | | |
|---|---|---|
| 2022/0224490 A1 | 7/2022 | Khoshnevisan et al. |
| 2022/0272733 A1 | 8/2022 | Gou et al. |
| 2023/0299893 A1* | 9/2023 | Liu .................. H04L 5/0055 |
| | | 370/329 |

OTHER PUBLICATIONS

ZTE Corporation: "Remaining Issues on Cross-Carrier Scheduling", 3GPP TSG RAN WG1 Meeting #98bis, 3GPP Draft, R1-1910111, Remaining Issues On Cross-Carrier Scheduling, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, pp. 1-4, Oct. 5, 2019 (Oct. 5, 2019), XP051808441, p. 2, paragraph 3—p. 4.

* cited by examiner

ASSIGNMENT INDEXES FOR DYNAMIC FEEDBACK

CROSS REFERENCE

The present Application for Patent is a continuation of U.S. patent application Ser. No. 17/148,251 by KHOSHNEVISAN et al., entitled "ASSIGNMENT INDEXES FOR DYNAMIC FEEDBACK," filed Jan. 13, 2021, assigned to the assignee hereof, and expressly incorporated by reference in its entirety herein.

FIELD OF TECHNOLOGY

The following relates to wireless communications, including assignment indexes for dynamic feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support assignment indexes for dynamic feedback. Generally, the described techniques provide for determining an order of assignment indicator values (e.g., a downlink assignment indicator (DAI) values) in a feedback message when two scheduling cells in the same monitoring occasion schedule transmissions in the same scheduled serving cell. Assignment indicator values may be assigned (e.g., by a UE) to transmissions according to a set of rules, and may serve as a temporary index to map each transmission to a corresponding feedback information in a feedback message (e.g., hybrid automatic repeat request (HARD) feedback, such as an acknowledgement (ACK) or negative acknowledgement (NACK)). A UE may use aspects of the described techniques to determine an order between assignment indicator values based on, for example, indexes of the scheduling serving cells, scheduled transmission start times for the scheduled transmissions, among other examples.

A method for wireless communication at a UE is described. The method may include receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission, identifying a first index associated with the first serving cell used to communicate the first control information and a second index associated with the second serving cell used to communicate the second control information, and determining an order between the first assignment indicator value for the first transmission and the second assignment indicator value for the second transmission based on the first index of the first serving cell used to communicate the first control information and the second index of the second serving cell used to communicate the second control information, the first assignment indicator value and the second assignment indicator value are associated with a hybrid automatic repeat request acknowledgement feedback.

An apparatus for wireless communication at a UE is described. The apparatus may include a processor, memory in electronic communication with the processor, and instructions stored in the memory. The instructions may be executable by the processor to cause the apparatus to receive, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission, identify a first index associated with the first serving cell used to communicate the first control information and a second index associated with the second serving cell used to communicate the second control information, and determine an order between the first assignment indicator value for the first transmission and the second assignment indicator value for the second transmission based on the first index of the first serving cell used to communicate the first control information and the second index of the second serving cell used to communicate the second control information, the first assignment indicator value and the second assignment indicator value are associated with a hybrid automatic repeat request acknowledgement feedback.

Another apparatus for wireless communication at a UE is described. The apparatus may include means for receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission, means for identifying a first index associated with the first serving cell used to communicate the first control information and a second index associated with the second serving cell used to communicate the second control information, and means for determining an order between the first assignment indicator value for the first transmission and the second assignment indicator value for the second transmission based on the first index of the first serving cell used to communicate the first control information and the second index of the second serving cell used to communicate the second control information, the first assignment indicator value and the second assignment indicator value are associated with a hybrid automatic repeat request acknowledgement feedback.

A non-transitory computer-readable medium storing code for wireless communication at a UE is described. The code may include instructions executable by a processor to receive, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission, identify a first index associated with the first serving cell used to communicate the first control information and a second index associated with the second serving cell used to communicate the second control information, and determine an order between the first assignment indicator value for the first transmission and the second assignment indicator value for the second transmission based on the first index of the first serving cell used to communicate the first control information and the second index of the second serving cell used to communicate the second control information, the first assignment indicator value and the second assignment indicator value are associated with a hybrid automatic repeat request acknowledgement feedback.

Some examples of the method, apparatuses, and non-transitory computer-readable medium described herein may further include operations, features, means, or instructions for receiving, during the monitoring occasion, a third control information over the first serving cell that schedules a third transmission for the third serving cell and identifying a first start time for the first transmission scheduled by the first serving cell and a second start time for the third transmission scheduled by the first serving cell, where determining the order of the first assignment indicator value and the second assignment indicator value may be based on the first start time and the second start time.

Some examples of the method, apparatuses, and non-transitory computer-readable medium described herein may further include operations, features, means, or instructions for determining the order between a third assignment indicator value for the third transmission, the first assignment indicator value, and the second assignment indicator value based on the first index of the first serving cell used to communicate the third control information, the first start time, and the second start time.

In some examples of the method, apparatuses, and non-transitory computer-readable medium described herein, a lower value of the first assignment indicator value and the third assignment indicator value corresponds to an earlier start time of the first start time and the second start time.

Some examples of the method, apparatuses, and non-transitory computer-readable medium described herein may further include operations, features, means, or instructions for receiving, during a second monitoring occasion after the monitoring occasion, a third control information over the first serving cell that schedules a third transmission for the third serving cell and determining the order between a third assignment indicator value for the third transmission, the first assignment indicator value, and the second assignment indicator value based on the second monitoring occasion occurring after the monitoring occasion.

In some examples of the method, apparatuses, and non-transitory computer-readable medium described herein, a lower value of the first assignment indicator value and the third assignment indicator value corresponds to the monitoring occasion occurring before the second monitoring occasion.

Some examples of the method, apparatuses, and non-transitory computer-readable medium described herein may further include operations, features, means, or instructions for receiving, during the monitoring occasion, a third control information over the first serving cell that schedules a third transmission for a fourth serving cell, identifying a third index of the third serving cell scheduled by the first control information and the second control information and a fourth index of the fourth serving cell scheduled by the third control information, and determining the order between a third assignment indicator value for the third transmission, the first assignment indicator value, and the second assignment indicator value based on the third index and the fourth index.

In some examples of the method, apparatuses, and non-transitory computer-readable medium described herein, a lower value of the first assignment indicator value and the third assignment indicator value corresponds to a lower index value of the third index associated with the third serving cell and the fourth index associated with the fourth serving cell.

Some examples of the method, apparatuses, and non-transitory computer-readable medium described herein may further include operations, features, means, or instructions for transmitting feedback information for the first transmission and the second transmission based on determining the order between the first assignment indicator value and the second assignment indicator value.

In some examples of the method, apparatuses, and non-transitory computer-readable medium described herein, the feedback information includes a hybrid automatic repeat request acknowledgement or a hybrid automatic repeat request negative acknowledgement for the first transmission and the second transmission.

In some examples of the method, apparatuses, and non-transitory computer-readable medium described herein, the feedback information may be communicated over a physical uplink control channel.

In some examples of the method, apparatuses, and non-transitory computer-readable medium described herein, the first serving cell includes a primary cell and the second serving cell includes a secondary cell.

In some examples of the method, apparatuses, and non-transitory computer-readable medium described herein, the first assignment indicator value includes a value of a downlink assignment indicator (DAI).

In some examples of the method, apparatuses, and non-transitory computer-readable medium described herein, a lower value of the first assignment indicator value and the second assignment indicator value corresponds to a lower index value of the first index associated with the first serving cell and the second index associated with the second serving cell.

In some examples of the method, apparatuses, and non-transitory computer-readable medium described herein, the first transmission or the second transmission may be communicated over a physical downlink shared channel or includes a release of semi-persistent scheduling resources.

In some examples of the method, apparatuses, and non-transitory computer-readable medium described herein, the third serving cell scheduled by the first control information and the second control information includes the first serving cell.

In some examples of the method, apparatuses, and non-transitory computer-readable medium described herein, the third serving cell scheduled by the first control information and the second control information may be different than the first serving cell and the second serving cell.

A method for wireless communication at a UE is described. The method may include receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission, identifying a first start time for the first transmission and a second start time for the second transmission, and determining an order between the first assignment indicator value for the first transmission and the second assignment indicator value for the second transmission based on the first start time for the first transmission and the second start time for the second transmission, where the first assignment indicator value and the second assignment indicator value are associated with a hybrid automatic repeat request acknowledgement feedback.

An apparatus for wireless communication at a UE is described. The apparatus may include a processor, memory in electronic communication with the processor, and instructions stored in the memory. The instructions may be executable by the processor to cause the apparatus to receive, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission, identify a first start time for the first transmission and a second start time for the second transmission, and determine an order between the first assignment indicator value for the first transmission and the second assignment indicator value for the second transmission based on the first start time for the first transmission and the second start time for the second transmission, where the first assignment indicator value and the second assignment indicator value are associated with a hybrid automatic repeat request acknowledgement feedback.

Another apparatus for wireless communication at a UE is described. The apparatus may include means for receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission, means for identifying a first start time for the first transmission and a second start time for the second transmission, and means for determining an order between the first assignment indicator value for the first transmission and the second assignment indicator value for the second transmission based on the first start time for the first transmission and the second start time for the second transmission, where the first assignment indicator value and the second assignment indicator value are associated with a hybrid automatic repeat request acknowledgement feedback.

A non-transitory computer-readable medium storing code for wireless communication at a UE is described. The code may include instructions executable by a processor to receive, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission, identify a first start time for the first transmission and a second start time for the second transmission, and determine an order between the first assignment indicator value for the first transmission and the second assignment indicator value for the second transmission based on the first start time for the first transmission and the second start time for the second transmission, where the first assignment indicator value and the second assignment indicator value are associated with a hybrid automatic repeat request acknowledgement feedback.

In some examples of the method, apparatuses, and non-transitory computer-readable medium described herein, the first serving cell may be different than the second serving cell.

In some examples of the method, apparatuses, and non-transitory computer-readable medium described herein, the first transmission may be scheduled in the third serving cell using the first control information communicated over the first serving cell and the second control information communicated over the second serving cell that may be different than the first serving cell.

Some examples of the method, apparatuses, and non-transitory computer-readable medium described herein may further include operations, features, means, or instructions for receiving, during a second monitoring occasion after the monitoring occasion, a third control information over the first serving cell that schedules a third transmission for the third serving cell and determining the order between a third assignment indicator value for the third transmission, the first assignment indicator value, and the second assignment indicator value based on the second monitoring occasion occurring after the monitoring occasion.

In some examples of the method, apparatuses, and non-transitory computer-readable medium described herein, a lower value of the first assignment indicator value and the third assignment indicator value corresponds to the monitoring occasion occurring before the second monitoring occasion.

Some examples of the method, apparatuses, and non-transitory computer-readable medium described herein may further include operations, features, means, or instructions for receiving, during the monitoring occasion, a third control information over the first serving cell that schedules a third transmission for a fourth serving cell, identifying a third index of the third serving cell scheduled by the first control information and the second control information and a fourth index of the fourth serving cell scheduled by the third control information, and determining the order between a third assignment indicator value to the third transmission, the first assignment indicator value, and the second assignment indicator value based on the third index and the fourth index.

In some examples of the method, apparatuses, and non-transitory computer-readable medium described herein, a lower value of the first assignment indicator value and the third assignment indicator value corresponds to a lower index value of the third index associated with the third serving cell and the fourth index associated with the fourth serving cell.

Some examples of the method, apparatuses, and non-transitory computer-readable medium described herein may further include operations, features, means, or instructions for transmitting feedback information for the first transmission and the second transmission based on determining the order between the first assignment indicator value and the second assignment indicator value, where the feedback information includes a hybrid automatic repeat request acknowledgement or a hybrid automatic repeat request negative acknowledgement for the first transmission and the second transmission.

In some examples of the method, apparatuses, and non-transitory computer-readable medium described herein, the feedback information includes a hybrid automatic repeat request acknowledgement or a hybrid automatic repeat request negative acknowledgement for the first transmission and the second transmission.

In some examples of the method, apparatuses, and non-transitory computer-readable medium described herein, the feedback information may be communicated over a physical uplink control channel.

In some examples of the method, apparatuses, and non-transitory computer-readable medium described herein, the first serving cell includes a primary cell and the second serving cell includes a secondary cell.

In some examples of the method, apparatuses, and non-transitory computer-readable medium described herein, the first assignment indicator value includes a value of a downlink assignment indicator (DAI).

In some examples of the method, apparatuses, and non-transitory computer-readable medium described herein, a lower value of the first assignment indicator value and the second assignment indicator value corresponds to an earlier start time of the first start time and the second start time.

In some examples of the method, apparatuses, and non-transitory computer-readable medium described herein, the first transmission or the second transmission may be communicated over a physical downlink shared channel or includes a release of semi-persistent scheduling resources.

In some examples of the method, apparatuses, and non-transitory computer-readable medium described herein, the third serving cell scheduled by the first control information and the second control information includes the first serving cell.

In some examples of the method, apparatuses, and non-transitory computer-readable medium described herein, the third serving cell scheduled by the first control information and the second control information may be different than the first serving cell and the second serving cell.

DETAILED DESCRIPTION

Figure 1:
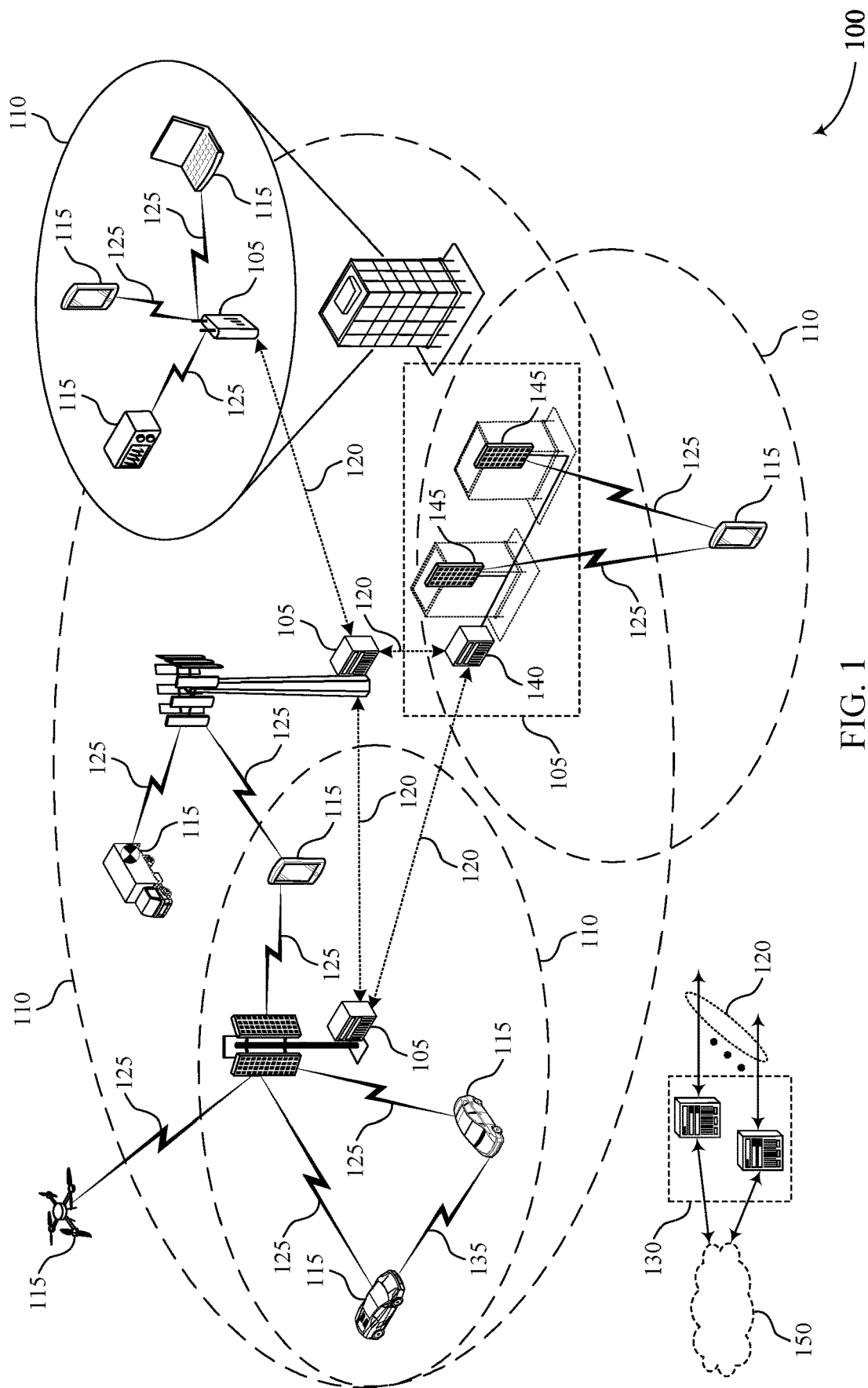
FIG. 1 illustrates an example of a wireless communications system that supports assignment indexes for dynamic feedback in accordance with aspects of the present disclosure.

Wireless communication systems may schedule communications using a grant, e.g., a downlink control information (DCI) grant (which may also be referred to as simply DCI). For example, a base station may transmit DCI grants to user equipment (UE) to schedule downlink transmissions, with each DCI grant identifying resources and other information to be used for the corresponding downlink transmission. Generally, the DCI may indicate whether feedback reporting is requested for the downlink transmission. For example, the DCI may indicate that feedback reporting is requested, and may also identify the parameters for the feedback report (or message). For example, the DCI may indicate whether the feedback message utilizes a type-II (e.g., dynamic) hybrid automatic repeat/request-acknowledgment (HARQ-ACK) codebook design or a type-I HARQ-ACK codebook design. Moreover, an assignment indicator field (e.g., a downlink assignment indicator (DAI) field) in the DCI may indicate a numerical sequence (e.g., a counting sequence for downlink transmissions associated with the same HARQ reporting occasion) for the downlink transmission to be reported in the feedback message. That is, the assignment indicator may be assigned to a downlink transmission and may serve as a temporary index to map the downlink transmission to its corresponding HARQ feedback.

A UE may thus group HARQ feedback (e.g., ACKs and NACKs) for multiple downlink transmissions into a common feedback message (e.g., a physical uplink control channel (PUCCH)) message) according to the assignment indicator value of each transmission. The UE may determine an order between the assignment indicator values for a downlink transmissions in a feedback message according to one or more rules, e.g., based on one or more associated indexes. For instance, the assignment indicator value may be ordered based on a scheduled serving cell index (e.g., the index of the serving cell for which the transmission was scheduled) or a monitoring occasion index (e.g., the index of the monitoring occasion in which the DCI was received). However, in some circumstances, such rules may not be appropriate or may have limited applicability, and the UE may therefore be unable to determine the order for the assignment indicator values in such situations. For example, if two DCIs in two different scheduling serving cells schedule two transmissions in the same scheduled serving cell during the same monitoring occasion, the UE may have challenges ordering the assignment indicator values for the two scheduled transmissions.

Various techniques described herein support determining an order between assignment indicator values (e.g., DAIs) for downlink transmissions when two scheduling serving cells in a same monitoring occasion schedule transmissions in the same scheduled serving cell. For instance, the UE may receive a first DCIs over a first scheduling serving cell and a second DCI over a second scheduling serving cell in a same monitoring occasion, where the DCIs schedule transmissions for a scheduled serving cell. The UE may determine an order of the DAIs for the transmissions in a feedback message and may construct a HARQ-ACK codebook (e.g., a type-2 or dynamic HARQ-ACK codebook) corresponding to the transmissions based on the DAIs.

In a first example, the UE may determine an order of DAI values for each transmission based on the index of the scheduling serving cell(s). The UE may order the DAIs in increasing order of the scheduling serving cell index. In some cases, the DCIs may schedule transmissions for two or more scheduled serving cells, and the DAIs may be ordered first in increasing order of the scheduling serving cell index and second in increasing order of the scheduled serving cell index. In some examples, the UE may receive such DCIs in multiple different monitoring occasions, and the UE may order the DAIs first in increasing order of the scheduling serving cell index, second in increasing order of the scheduled serving cell index, and third in increasing order of the monitoring occasions.

In a second example, the UE may determine an order of DAI values for each transmission based on a start time of the scheduled transmissions. The UE may order the DAIs first in increasing order of the start time of the scheduled transmissions. In cases where transmissions have a same start time or where the transmissions are scheduled for multiple scheduled serving cells, the UE may order DAIs first in increasing order of the start time and second in increasing order of the scheduled serving cell index. Additionally, if the UE receives DCIs in multiple different monitoring occasions, the UE may order the DAIs third in increasing order of the monitoring occasions.

Aspects of the disclosure are initially described in the context of wireless communications systems. Aspects of the disclosure are then described with reference to transmission diagrams and process flows. Aspects of the disclosure are further illustrated by and described with reference to apparatus diagrams, system diagrams, and flowcharts that relate to assignment indexes for dynamic feedback.

FIG. 1 illustrates an example of a wireless communications system 100 that supports assignment indexes for dynamic feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may group HARQ feedback for multiple downlink transmissions into a common feedback message, such as a PUCCH transmission. In such examples, the UE 115 may determine an order of assignment indicator values (e.g., DAI values) for each downlink transmission and may construct a codebook (e.g., a type-2 HARQ/ACK codebook) based on the order of the assignment indicator values. The UE 115 may determine the order of the assignment indicator values for the downlink transmissions according to one or more rules. The assignment indicator values may serve as temporary indexes to map each downlink transmission to its corresponding HARQ feedback in the PUCCH message.

A UE 115 may receive (e.g., from a base station 105) a DCI during a monitoring occasion, such as a PDCCH monitoring occasion (PMO). The DCI may be received over a first serving cell, which may be referred to as a scheduling serving cell, and may schedule one or more transmissions (e.g., physical downlink shared channel (PDSCH) transmissions, semi-persistent scheduling (SPS) resource releases) for a second serving cell (e.g., a component carrier, a primary cell, a secondary cell, etc.), which may be referred to as a scheduled serving cell. The UE 115 may receive additional DCIs over other scheduling serving cells to schedule additional transmissions for the scheduled serving cell. In some examples, the additional DCIs may be received by the UE 115 in the same monitoring occasion.

The UE 115 may determine an order of DAI values for each scheduled transmission for one or more scheduled serving cells based on one or more rules. In a first example, the UE 115 may identify indexes associated with each scheduling serving cell, and may determine an order of DAI values to each scheduled transmission based on the indexes of the scheduling serving cells. For instance, the UE 115 may determine an order of DAI values in increasing order of the scheduling serving cell index for transmissions scheduled by DCIs received in a same monitoring occasion. In this example, a transmission scheduled by a DCI received over a scheduling serving cell with an index of 1 may be assigned a lower value than a transmission scheduled by a DCI received over a scheduling serving cell with an index of 2. In a second example, the UE 115 may identify a start time for each scheduled transmission and may determine an order of the DAI values based on the start times. For instance, the UE 115 may determine an order of DAI values in increasing order of the transmission start time for transmissions scheduled by DCIs received in a same monitoring occasion. In some cases, the UE 115 may use some combination of the techniques described herein, or may use other techniques in addition to or in combination with the techniques described herein.

Figure 2:
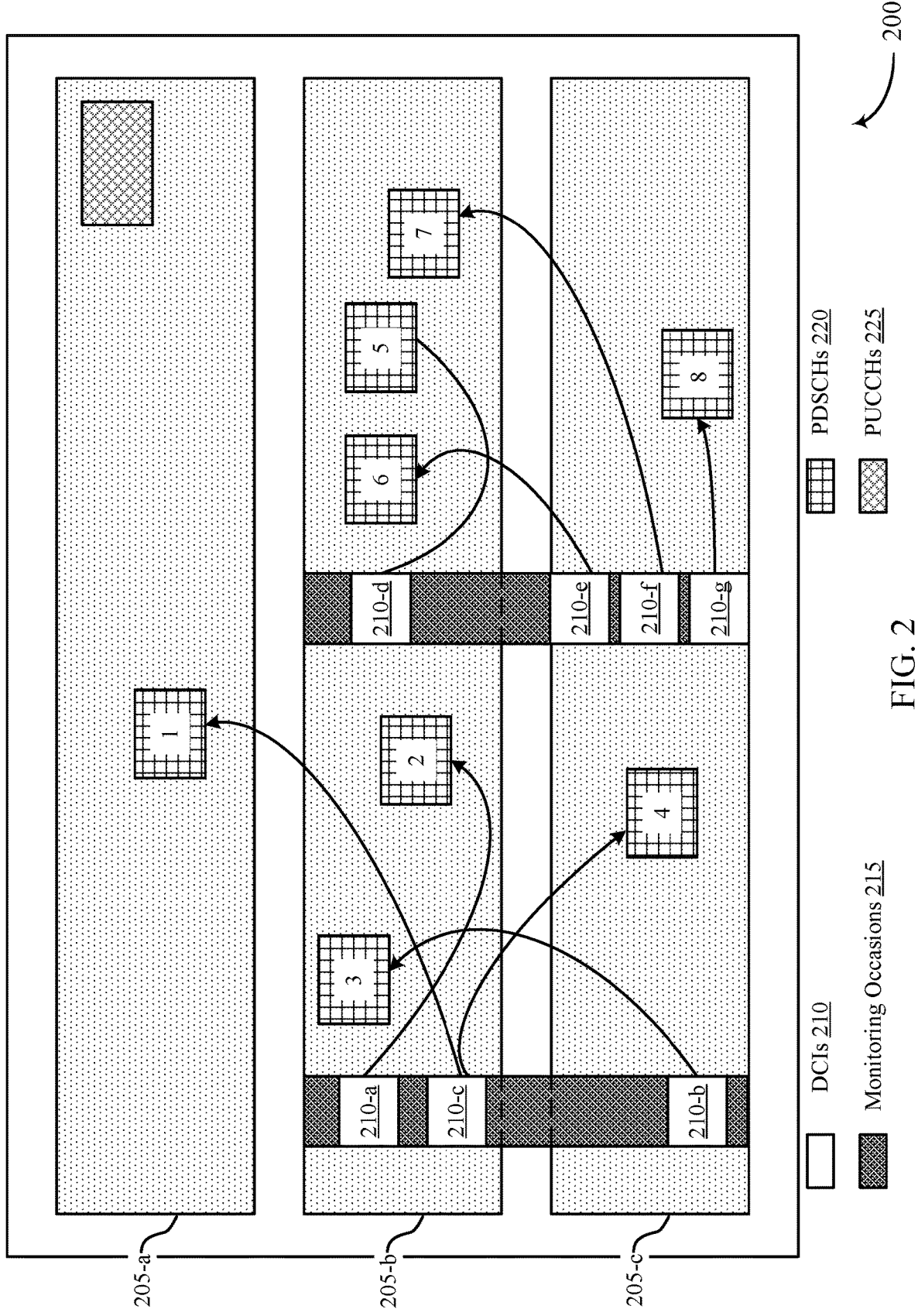
FIGS. 2 and 3 illustrate examples of transmission configurations that support assignment indexes for dynamic feedback in accordance with aspects of the present disclosure.

FIG. 2 illustrates an example of a transmission configuration 200 that supports assignment indexes for dynamic feedback in accordance with aspects of the present disclosure. In some examples, the transmission configuration 200 may implement aspects of wireless communication system 100. The transmission configuration 200 illustrates serving cells 205 over which a base station 105 and a UE 115, as described with reference to FIG. 1, may communicate. For example, a base station may transmit, to a UE, DCIs 210 during monitoring occasions 215. The DCIs 210 may schedule one or more transmissions, such as PDSCHs 220. As described herein, the UE may determine an order of an assignment indicator value (e.g., a DAI value) to each PDSCH 220, where the assignment indicator value may be used to map the PDSCHs 220 to corresponding feedback (e.g., HARQ) information. The UE may transmit the feedback information for the PDSCHs 220 in a common PUCCH 225.

During a monitoring occasion 215, the UE may monitor for and receive control information (e.g., DCIs 210) over one or more serving cells 205, where the control information includes scheduling information for one or more transmissions (e.g., PDSCHs 220) for one or more serving cells 205. A serving cell 205 over which a DCI 210 is received may be referred to as a scheduling serving cell, while a serving cell 205 for which a PDSCH 220 is scheduled may be referred to as a scheduled serving cell. A scheduling serving cell (e.g., serving cell 205-*b*) may thus schedule PDSCHs 220 for one or more scheduled serving cells (e.g., serving cells 205-*a* and 205-*c*). In some cases, a scheduling serving cell may schedule PDSCHs 220 for itself, e.g., the scheduling serving cell and the scheduled serving cell may be the same. Each serving cell 205 may be associated with a serving cell index. In some cases, the serving cells may be referred to as component carriers and the serving cell index may be an example of a component carrier index.

The UE may receive the PDSCHs 220 over the serving cells 205 according to the scheduling information and may determine feedback for each PDSCH 220. In some examples, a DCI 210 may indicate that the base station requests feedback for the corresponding PDSCH 220 and, in some cases, the parameters for the feedback message. As an example, a DCI 210 may indicate that the UE should construct a type-2 (e.g., dynamic) HARQ/ACK codebook for the feedback message. The feedback may indicate, to the base station, an ACK or a NACK for each PDSCH 220. For instance, if the UE did not receive a PDSCH 220 or did not receive the PDSCH 220 correctly, the UE may indicate a NACK for the PDSCH 220 in the corresponding feedback. Alternatively, if the UE successfully received a PDSCH 220, the UE may indicate an ACK in the corresponding feedback.

The UE may group the feedback for multiple PDSCHs 220 into a common feedback message, which may be transmitted via PUCCH 225. To support the grouped feedback, the UE may determine an order of an assignment indicator value (e.g., a DAI) for each PDSCH 220 and may use the order of the DAIs to map the PDSCH 220 to its corresponding feedback in the PUCCH 225. That is, the UE may use the order of the DAIs to construct the HARQ/ACK codebook transmitted via the PUCCH 225. For instance, the UE may construct the HARQ-Ack codebook based on the DAI values assigned to PDSCHs 220 according to one or more rules regarding the ordering of the DAI values, e.g., the UE may determine the order of the DAI values based on one or more conditions. For example, a first rule may be that DAI values are assigned after each monitoring occasion. For example, DCIs received during a first monitoring occasion may receive lower DAI values than DCIs received during a second monitoring occasion that occurs after the first monitoring occasion. In some examples, DAI values may be based on the monitoring occasion 215 in which the DCIs 210 scheduling the PDSCHs 220 were received. If the UE receives, during a first monitoring occasion 215, a first DCI 210 scheduling a first PDSCH 220, and also receives, during a second monitoring occasion 215, a second DCI 210 scheduling a second PDSCH 220, the UE may determine an order of the DAI values for the first and second PDSCHs 220 according to an order that is based on the respective DCIs 210 being received in the different monitoring occasions. The order determined by the UE may be based on a lower DAI value, for example, to a PDSCH 220 scheduled by a DCI 210 received in a monitoring occasion 215 that occurs earlier in time; in this specific example, the order determined by the UE may be based on a lower DAI value to the first PDSCH 220 than the DAI value assigned to the second PDSCH 220.

As an example of a second rule, the UE may determine an order of a DAI value based on an index associated with the scheduled serving cell of the PDSCH 220, where the scheduled serving cell is the serving cell 205 for which the PDSCH 220 was scheduled. Using the same example described above, the first PDSCH 220 may be scheduled for a serving cell 205 associated with an index of 2, and the second PDSCH 220 may be scheduled for a serving cell 205 associated with an index of 1. The DAI values may be ordered corresponding to the indexes, for example, such that a lower index of the scheduled serving cell corresponds to a lower DAI value. The order for the first PDSCH 220 may therefore be assigned a value of 2 (e.g., the second DAI), while the second PDSCH 220 may be assigned a value of 1 (e.g., the first DAI in the order).

In some cases, however, the first rule or the second rule alone may not be enough for the UE to determine an order of the DAI values for PDSCHs 220, and the UE may use multiple rules in combination. For example, if two different scheduling serving cells (e.g., cells 205-*b* and 205-*c*) schedule different transmissions (e.g., PDSCHs using DCIs 210-*a* and 210-*b*) in the same scheduled (e.g., cell 205-*b*), the UE may not be capable of ordering assignment indicator values between the two scheduled transmissions. In some examples, the UE may receive, during a first monitoring occasion 215 and over a first scheduling serving cell, two DCIs 210 that schedule two PDSCHs 220 for a first scheduled serving cell. The UE may also receive, during the same monitoring occasion 215 but over a second scheduling serving cell, a second two DCIs 210 that schedule a second two PDSCHs 220 for a second scheduled serving cell. During a second monitoring occasion 215, the UE may receive a third two DCIs 210 that schedule a third two PDSCHs 220 for a third scheduled serving cell. The first scheduled serving cell may be associated with an index of 2, the second scheduled serving cell may be associated with an index of 3, and the third scheduled serving cell may be associated with an index of 1. The UE may apply the first rule to determine DAI values based on the first and second monitoring occasions 215, e.g., the PDSCHs 220 scheduled by DCIs 210 received in the first monitoring occasion 215 may have lower DAI values than the PDSCHs 220 scheduled by DCIs 210 received in the second monitoring occasion 215. The second rule may be applied to further determine DAI values based on the indexes of the scheduled serving cells for PDSCHs 220 scheduled by DCIs 210 received during the same monitoring occasion 215. For example, the first two PDSCHs 220 are associated with an index of 2 and the second two PDSCHs 220 are associated with an index of 3; thus, the first two PDSCHs 220 may be ordered to have lower values than the second two PDSCHs 220.

To further refine the DAI values for the PDSCHs 220 that are scheduled by DCIs 210 received during the same monitoring occasion 215 and associated with the same scheduled serving cell (and thus same scheduled serving cell index), the UE may use an additional rule to determine a start time for each PDSCH 220 and may determine an order of DAI values based on the start time. For example, the UE may identify which of the first two PDSCHs 220 have an earlier start time, and may determine an order of that includes the earlier start time being earlier in the order. In such a manner, the UE may accumulatively order DAI values in the feedback message according to a variety of rules.

However, the UE may encounter additional scenarios for which existing rules may not be applicable, and the UE may be unable to determine an order of DAI values. The rules described above, for example, may not cover situations where PDSCHs 220 are scheduled by DCIs 210 that are received over different scheduling serving cells. For instance, a UE may receive two DCIs 210 in a same monitoring occasion 215 over two different scheduling serving cells, where the two DCIs 210 each schedule PDSCHs 220 in a same scheduled serving cell. That is, the two PDSCHs 220 may be associated with a same scheduled serving cell index and a same monitoring occasion 215, such that the first and second rules may not be useful in determining the order of the DAI values. Additionally, some existing rules (such as a start time rule) may be limited to ordering DAI values with the same scheduling serving cells.

According to the techniques described herein, a UE may support additional rules for ordering DAI values in a feedback message, and in particular, for PDSCHs 220 scheduled by DCIs 210 received over different scheduling serving cells. For example, during a first monitoring occasion, a UE may receive a first and second control information over a first and second serving cell, respectively, where the first and second control information each schedule a respective transmission for a third serving cell. In this example, the first and second serving cells may be considered scheduling serving cells, and the third serving cell may be considered a scheduled serving cell. In some cases, a scheduling serving cell may schedule itself (e.g., the first serving cell and the third serving cell may be the same serving cell). In any case, the UE may identify an index associated with each serving cell and may determine an order of DAI values according to the index and based on one or more rules. For example, the rule may be that a lower DAI value corresponds to a lower scheduling serving cell index. The UE may identify the indexes associated with the serving cells that are considered scheduling serving cells and may determine an order of DAI values to for first and second transmissions based on the indexes. Additionally, or alternatively, the rule may be that a lower DAI value corresponds to a lower scheduled serving cell index. The UE may identify the indexes associated with the serving cells that are considered scheduled serving cells and may determine an order of DAI values for the first and second transmissions.

As illustrated in FIG. 2, during a first monitoring occasion 215, the UE may receive DCIs 210-*a* and 210-*c* over a serving cell 205-*b* and DCI 210-*b* over a serving cell 205-*c*. The DCIs 210-*a*, 210-*b*, and 210-*c* may schedule a first, second, third, and fourth PDSCH 220 over serving cells 205. As illustrated, DCI 210-*c* may schedule the first PDSCH 220 for serving cell 205-*a* and the fourth PDSCH 220 for serving cell 205-*c*, DCI 210-*a* may schedule the second PDSCH 220 for serving cell 205-*b*, and DCI 210-*b* may schedule the third PDSCH 220 for serving cell 205-*b*.

During a second monitoring occasion 215, the UE may receive DCI 210-*d* over serving cell 205-*b* and DCIs 210-*e* through 210-*g* over serving cell 205-*c*. DCIs 210-*d* through 210-*f* may schedule a fifth, sixth, and seventh PDSCH 220, respectively, for serving cell 205-*b*. DCI 210-*g* may schedule an eighth PDSCH 220 for serving cell 205-*c*.

The UE may receive PDSCHs 220 over the scheduled serving cells 205 according to the corresponding DCIs 210, and may determine feedback for each PDSCH 220. The UE may determine an order of DAI values to be used in the feedback message according to one or more rules. The UE may, for example, order DAI values in increasing order of the monitoring occasion 215, the index of the scheduled serving cell 205, the index of the scheduling serving cell 205, the start time of the PDSCH 220, or some combination thereof. In the example of FIG. 2, the UE may an order DAI values received in DCIs 210 in the first monitoring occasion 215 as lower (e.g., DAIs received in the first monitoring occasion 215 may be ordered lower because the first monitoring occasion occurs before the second monitoring occasion 215).

For PDSCHs 220 scheduled by DCIs 210 received in a same monitoring occasion 215, such as the first through fourth DCIs 210, the UE may determine an order of DAI values based on an order of the index of the scheduled serving cell. The UE may identify, for each PDSCH 220, an index associated with the serving cell 205 for which the PDSCH 220 was scheduled. Serving cell 205-*a* may correspond to an index of 0, serving cell 205-*b* may correspond to an index of 1, and serving cell 205-*c* may correspond to an index of 2. The first PDSCH 220 may therefore be associated with a scheduled serving cell index of 0, the second and third PDSCHs 220 may be associated with a scheduled serving cell index of 1, and the fourth PDSCH 220 may be associated with a scheduled serving cell index of 2. Thus, the UE may determine an order of DAI values in an increasing order based on the scheduled serving cell index, such that the first PDSCH 220 is ordered to be lower (e.g., the lowest value), and the second and third PDSCHs 220 are ordered as lower than the fourth PDSCH 220.

For PDSCHs 220 scheduled by DCIs 210 received in a same monitoring occasion 215 and associated with a same scheduled serving cell index, such as the second and third PDSCH 220, the UE may determine an order of DAI values according to the index of the scheduling serving cell. Stated a different way, the DAI values may be ordered based on the serving cell 205 used to communicate the DCI 210 that scheduled the PDSCH 220. For example, serving cell 205-*b* was used to communicate DCI 210-*a* that scheduled the second PDSCH 220, and serving cell 205-*c* was used to communicate DCI 210-*b* that scheduled the third PDSCH 220. The UE may identify that serving cell 205-*b* (e.g., the scheduling serving cell for the second PDSCH 220) is associated with an index of 1, and serving cell 205-*c* (e.g., the scheduling serving cell for the third PDSCH 220) is associated with an index of 2. As a non-limiting example, the UE may determine that DAI values for PDSCHs 220 that are associated with lower serving cell index values are ordered as lower than DAI values associated with higher serving cell index values. Thus, the UE may order a DAI value for the second PDSCH 220 to be lower than the DAI value assigned to the third PDSCH 220.

The UE may determine an order of DAI values for the fifth through eighth PDSCHs 220 in a similar manner, as the fifth through eighth PDSCHs 220 are scheduled by DCIs 210 received in the same second monitoring occasion 215. That is, the UE may determine an order of the DAI values in increasing order of the associated scheduled serving cell index and the associated scheduling serving cell index An order of DIA values for the fifth through seventh PDSCHs 220 may be determined based on the respective associated scheduling serving cell index. For instance, the fifth PDSCH 220 is scheduled by DCI 210-*d* that is received over serving cell 205-*b*, while the sixth and seventh PDSCHs 220 are scheduled by DCIs 210-*e* and 210-*f* received over serving cell 205-*c*. The fifth PDSCH 220 therefore is associated with a scheduling serving cell index that is lower than the sixth and seventh PDSCHs 220 and may correspondingly be ordered as a lower DAI value.

Because the sixth and seventh PDSCHs 220 are associated with a same scheduling serving cell index, a same scheduled serving cell index, and a same monitoring occasion 215, the UE may determine an order of DAI values for the sixth and seventh PDSCHs 220 based on a start time of each PDSCH 220. For example, the UE may determine that a DAI value for a PDSCH 220 has a lower value because it has an earlier start time. Thus, the DAI value for the sixth PDSCH 220 may be ordered to be lower than the DAI value for the seventh PDSCH 220, as the sixth PDSCH 220 starts earlier than the seventh PDSCH 220.

The UE may transmit feedback information for the PDSCHs 220 in a feedback message via PUCCH 225, where the feedback information may include an ACK or a NACK for each PDSCH 220. The UE may construct a codebook based on ordering the DAI values, where the feedback is transmitted in an order corresponding to the DAI values. For instance, the UE may order the feedback in increasing order from the lowest DAI value to the highest DAI value, where the feedback for the first PDSCH 220 is transmitted first, followed by the feedback for the second PDSCH 220, and so on, until feedback for every PDSCH 220 has been transmitted.

Figure 3:
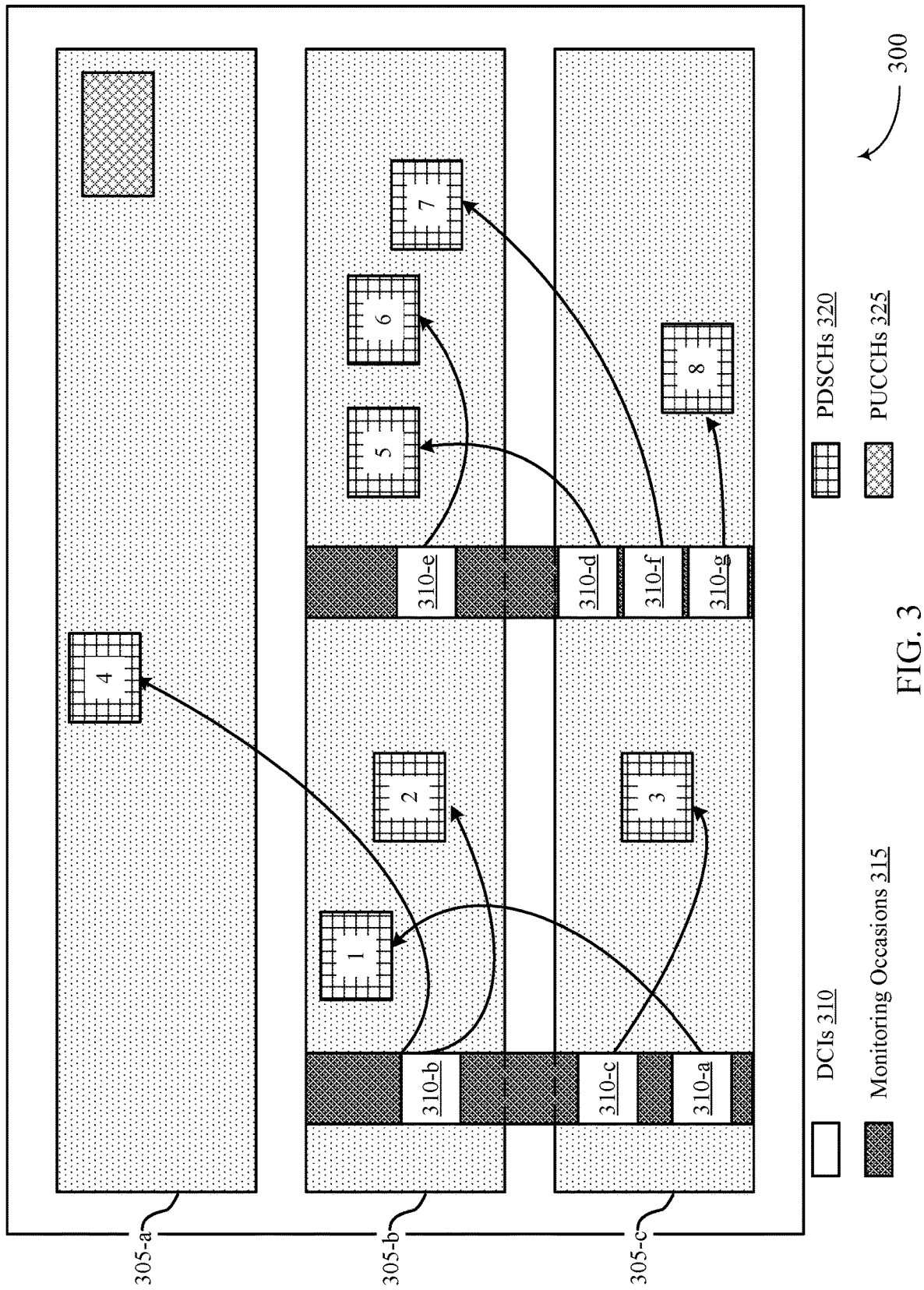

FIG. 3 illustrates an example of a transmission configuration 300 that supports assignment indexes for dynamic feedback in accordance with aspects of the present disclosure. In some examples, the transmission configuration 300 may implement aspects of wireless communication system 100. The transmission configuration 300 illustrates serving cells 305 over which a base station 105 and a UE 115, as described with reference to FIG. 1, may communicate. For example, a base station may transmit, to a UE, DCIs 310 during monitoring occasions 315. The DCIs 310 may schedule one or more transmissions, such as PDSCHs 320. As described herein, the UE may determine an order between assignment indicator values (e.g., a DAI value) for each PDSCH 320, where the assignment indicator values may be used to map the PDSCHs 320 to corresponding feedback (e.g., HARQ) information in a feedback message. The UE may transmit the feedback information for the PDSCHs 320 in a common PUCCH 325.

As described with reference to FIG. 2, the UE may determine an order of assignment indicator values (e.g., DAIs) for each PDSCH 320 according to one or more rules, e.g., the UE may determine an order of DAI values based on one or more conditions. In the example of FIG. 3, the UE may determine an order of DAI values according to a set of rules in addition to or as an alternative to those described with reference to FIG. 2. For example, the UE may determine an order of DAI values according to the monitoring occasion 315 in which the DCIs 310 scheduling the PDSCHs 320 were received or based on an index associated with the scheduled serving cell and/or the scheduling serving cell of the PDSCH 320. If, however, PDSCHs 320 are received in the same monitoring occasion 315 and are associated with the same scheduled serving cell index, the UE may determine an order of DAI values based on start times of the PDSCHs 320.

As illustrated in FIG. 3, during a first monitoring occasion 315, the UE may receive DCIs 310-a and 310-c over a serving cell 305-c and DCI 310-b over a serving cell 305-b. The DCIs 310-a, 310-b, and 310-c may each schedule PDSCHs 320 over serving cells 305. The DCIs 310-a, 310-b, and 310-c may include DAIs for the scheduled PDSCHs 320. As illustrated, DCI 310-a may schedule a first PDSCH 320 for serving cell 305-b, DCI 310-b may schedule a second PDSCH 320 for serving cell 305-b, and DCI 310-c may schedule a third PDSCH 320 for serving cell 305-c and a fourth PDSCH 320 for serving cell 305-a. During a second monitoring occasion 315, the UE may receive DCI 310-e over serving cell 305-b and DCIs 310-d, 310-f, and 310-g over serving cell 305-c. DCIs 310-d through 310-f may schedule a fifth, sixth, and seventh PDSCH 320, respectively, for serving cell 305-b. DCI 310-g may schedule an eighth PDSCH 320 for serving cell 305-c.

The UE may receive PDSCHs 320 over the scheduled serving cells 305 according to the corresponding DCIs 310, and may determine feedback for each PDSCH 320. The UE may determine an order of DAI values for each PDSCH 320 to be used in the feedback message based on the monitoring occasion 315, e.g., the UE may determine that DAI values for PDSCHs 320 scheduled by DCIs 310 received in the first monitoring occasion 315 are lower in the order than DAI values for PDSCHs 320 scheduled by DCIs 310 received in the second monitoring occasion 315, as the first monitoring occasion 315 occurs before the second monitoring occasion 315.

For PDSCHs 320 scheduled by DCIs 310 received in a same monitoring occasion 315, such as the first through fourth DCIs 310, the UE may determine an order of DAI values based on an order of the index of the scheduled serving cell. The UE may identify, for each PDSCH 320, an index associated with the serving cell 305 for which the PDSCH 320 was scheduled. Serving cell 305-a may correspond to an index of 0, serving cell 305-b may correspond to an index of 1, and serving cell 305-c may correspond to an index of 3. The fourth PDSCH 320 may therefore be associated with a scheduled serving cell index of 0, the first and second PDSCHs 320 may be associated with a scheduled serving cell index of 1, and the third PDSCH 320 may be associated with a scheduled serving cell index of 2. Thus, the UE may determine an order of DAI values in an increasing order based on the scheduled serving cell index, such that the fourth PDSCH 320 is ordered to be the lowest DAI value, and the first and second PDSCHs 320 are ordered to be lower than the DAI value for the third PDSCH 320.

For PDSCHs 320 scheduled by DCIs 310 received in a same monitoring occasion 315 and associated with a same scheduled serving cell index, such as the first and second PDSCH 320, the UE may determine an order of DAI values according to the start time of the PDSCHs. The UE may identify the start time of each of the first and second PDSCHs 320 and may determine an order of a DAI value accordingly. For example, a lower DAI value may correspond to an earlier start time.

The UE may determine an order of DAI values for the fifth through eighth PDSCHs 320 in a similar manner, as the fifth through eighth PDSCHs 320 are scheduled by DCIs 310 received in the same second monitoring occasion 315. That is, the UE may determine an order of the DAI values in increasing order of the associated scheduled serving cell index and the start time of the PDSCHs 320. The fifth through seventh PDSCHs 320 are scheduled for serving cell 305-b associated with an index of 1, and may therefore be assigned a lower DAI value than the eighth PDSCH 320 scheduled for serving cell 305-c associated with an index of 3. The fifth through seventh PDSCHs 320 may be assigned DAI values based on their respective start times. For instance, the fifth PDSCH 320 starts earlier than the sixth PDSCH 320, which in turn starts earlier than the seventh PDSCH 320. The UE may determine that a DAI value for a PDSCH 320 that has an earlier start time is lower in the order. Thus, the fifth through seventh PDSCHs 320 may be ordered in increasing order, e.g., the fifth PDSCH 320 has a lower value than the sixth PDSCH 320 in the order, which in turn has a lower value than the seventh PDSCH 320 in the order.

The UE may transmit feedback information for the PDSCHs 320 in a feedback message via PUCCH 325, where the feedback information may include an ACK or a NACK for each PDSCH 320. The UE may construct a codebook based on ordering the DAI values, where the feedback is transmitted in an order corresponding to the DAI values. For instance, the UE may order the feedback in increasing order from the lowest DAI value to the highest DAI value, where the feedback for the first PDSCH 320 is transmitted first, followed by the feedback for the second PDSCH 320, and so on, until feedback for every PDSCH 320 has been transmitted.

Figure 4:
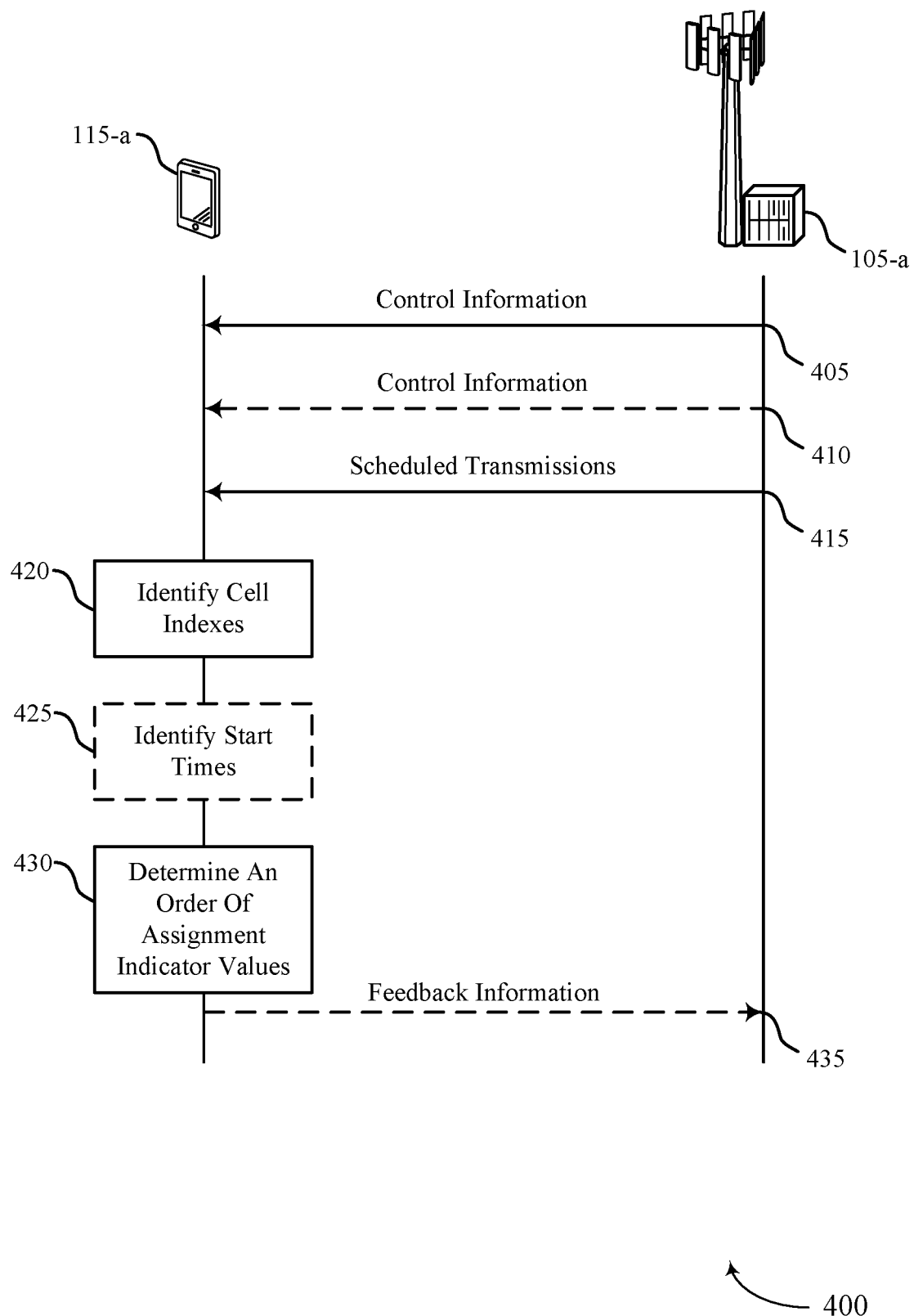
FIGS. 4 and 5 illustrate examples of process flows that support assignment indexes for dynamic feedback in accordance with aspects of the present disclosure.

FIG. 4 illustrates an example of a process flow 400 that supports assignment indexes for dynamic feedback in accordance with aspects of the present disclosure. In some examples, the process flow 400 may implement aspects of wireless communication system 100. For example, process flow 400 may include a base station 105-a and a UE 115-a, which may be examples of corresponding wireless devices as described herein. In the following description of the process flow 400, the operations between the UE 115-a and the base station 105-a may be transmitted in a different order than the order shown, or the operations performed by the UE 115-*a* and the base station 105-*a* may be performed in different orders or at different times. Certain operations may also be left out of the process flow 400, or other operations may be added to the process flow 400. While the UE 115-*a* and the base station 105-*a* are shown performing operations of process flow 400, any wireless device may perform the operations shown. Further, while FIG. 4 illustrates an example of communications between a UE 115-*a* and a base station 105-*a*, the techniques described herein may be applied to communications between any number of wireless devices.

The base station 105-*a* and the UE 115-*a* may communicate using one or more cells and/or component carriers, such as serving cells, primary cells, secondary cells, or some combination thereof, among other examples. During a monitoring occasion, the base station 105-*a* may transmit, to the UE 115-*a*, control information that schedules transmissions for the UE 115-*a*. The control information may be transmitted over a first serving cell, which may be referred to as a scheduling serving cell, and may schedule transmissions for the first serving cell or for one or more other serving cells, which may be referred to as scheduled serving cells.

At 405, the base station 105-*a* may transmit a first control information (e.g., a first DCI) over a first serving cell (e.g., a first scheduling serving cell) and a second control information (e.g., a second DCI) over a second serving cell (e.g., a second scheduling serving cell) during a first monitoring occasion (e.g., a PMO). The first and second DCI may schedule a first and second transmission (e.g., a PDSCH, an SPS release), respectively, for a third serving cell (e.g., a first scheduled serving cell). In some aspects, the third serving cell may be the first serving cell; that is, the first and second serving cells may both schedule transmissions for the first serving cell. In some examples, the first serving cell may be a primary cell and the second serving cell may be a secondary cell.

In some examples, the base station 105-*a* may transmit a third control information (e.g., a third DCI) over the first serving cell during the same monitoring occasion. In some cases, the third DCI schedules a third transmission for the third serving cell, while in other cases, the third DCI schedules a third transmission for a fourth serving cell (e.g., a second scheduled serving cell).

In some examples, at 410, the base station 105-*a* may transmit the third DCI during a second monitoring occasion different than the first monitoring occasion. The second monitoring occasion may occur after the first monitoring occasion.

At 415, the base station 105-*a* may transmit, and the UE 115-*a* may receive, the transmissions scheduled by the DCIs over the respective serving cells.

At 420, the UE 115-*a* may identify indexes associated with each serving cell. The UE 115-*a* may identify a first index associated with the first serving cell and a second index associated with the second cell. In some cases, the UE 115-*a* may optionally identify a third index of the third serving cell (e.g., scheduled by the first, second, and/or third DCIs). Additionally, the UE 115-*a* may optionally identify a fourth index of the fourth serving cell (e.g., scheduled by the third DCI).

At 425, in some examples, the UE 115-*a* may identify start times for the scheduled transmissions. If, for instance, the UE 115-*a* receives a third DCI at 405 (e.g., during the first monitoring occasion and over the first serving cell) that schedules a third transmission for the third serving cell, the UE 115-*a* may identify a first start time for the first transmission and a second start time for the third transmission.

At 430, the UE 115-*a* may determine an order of assignment indicator values (e.g., DAI values) associated with HARQ/ACK feedback for the scheduled transmissions based on the indexes identified at 420, the start times identified at 425, the corresponding monitoring occasions, or some combination thereof. The UE 115-*a* may determine an order between a first DAI value for the first transmission and a second DAI value for the second transmission based on the first index of the first serving cell and the second index of the second serving cell. That is, the DAI values may be order based on the indexes of the serving cells used to communicate the DCIs that scheduled the transmissions, for DCIs received in a same monitoring occasion. Stated another way, the DAI values for each transmission may be ordered in the feedback message based on the respective scheduling serving cell indexes. For example, the UE 115-*a* may determine an order between the first and second DAI values in increasing order of the serving cell indexes, such that a lower value of the first DAI value corresponds to a lower serving cell index value.

In cases where the UE 115-*a* receives a third DCI scheduling a third transmission, the UE 115-*a* may determine an order between a DAI value to the third transmission at 430 and the other DAI values. In some examples, receiving a third DCI scheduling a third transmission may also change the order of the DAI values. For example, the third transmission may be scheduled for the third serving cell by the third DCI, and the third DCI may be received in the first monitoring occasion (i.e., the same monitoring occasion as the first and second DCIs) and over the first serving cell. Thus, the third transmission may be associated with a scheduling serving cell index that is the same as the first transmission. In such examples, the UE 115-*a* may use the start time(s) identified at 425, in addition to the serving cell indexes, to order DAI values. As an illustrative example, the UE 115-*a* may determine an order between DAI values for the first transmission and the third transmission based on the start time of the first transmission and the start time of the third transmission, where a lower value of the DAI corresponds to an earlier start time.

If the third DCI is received by the UE 115-*a* in the second monitoring occasion, the UE 115-*a* may determine an order of the DAI value for the third transmission relative to the other DAI values based on the second monitoring occasion occurring after the monitoring occasion, for instance, where a higher DAI value corresponds to the second monitoring occasion occurring after the first monitoring occasion (and a lower DAI value of the first and/or second transmissions correspond to the first monitoring occasion occurring before the second monitoring occasion).

Alternatively, if the third DCI schedules the third transmission for the fourth serving cell, the UE 115-*a* may determine an order of DAI values for the third transmission relative to other DAI values based on the index of the third serving cell (e.g., scheduled by the first and second control information) and the fourth serving cell. That is, the UE 115-*a* may determine an order between DAI values for transmissions based on the indexes of the scheduled serving cells. The third serving cell and the fourth serving cell may be associated with respective serving cell indexes and the UE 115-*a* may use these indexes to determine an order of a DAI value for the third transmission relative to the other DAI values, where a lower DAI value may correspond to a lower serving cell index.

At 435, the UE 115-*a* may transmit, to the base station 105-*a*, feedback information for at least the first and second transmissions based on the DAI values ordered at 430. The feedback information may include a HARQ/ACK or a HARQ/NACK for each transmission. In some examples, the feedback information may be transmitted over a PUCCH.

Figure 5:
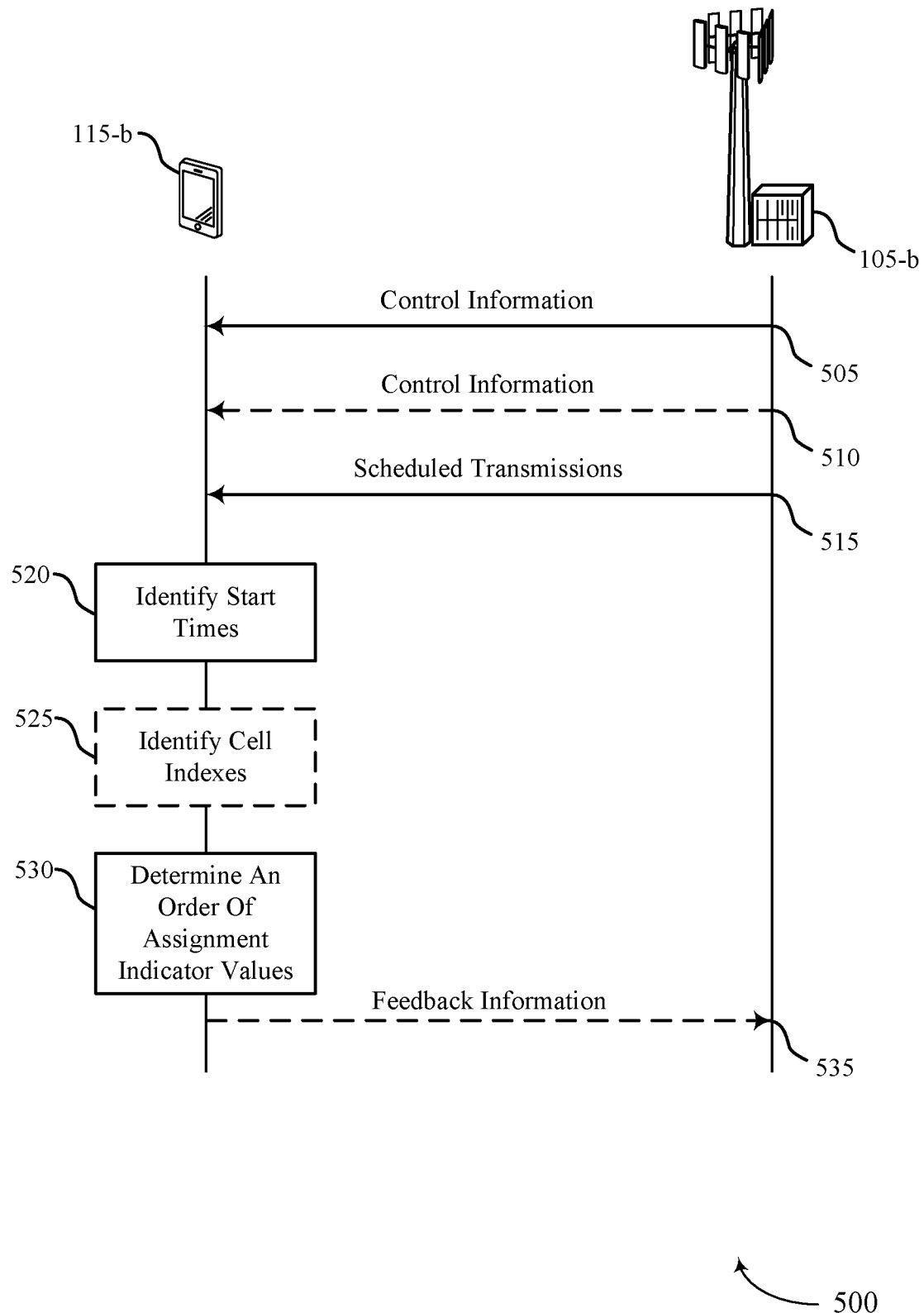

FIG. 5 illustrates an example of a process flow 500 that supports assignment indexes for dynamic feedback in accordance with aspects of the present disclosure. In some examples, the process flow 500 may implement aspects of wireless communication system 100. For example, process flow 500 may include a base station 105-*b* and a UE 115-*b*, which may be examples of corresponding wireless devices as described herein. In the following description of the process flow 500, the operations between the UE 115-*b* and the base station 105-*b* may be transmitted in a different order than the order shown, or the operations performed by the UE 115-*b* and the base station 105-*b* may be performed in different orders or at different times. Certain operations may also be left out of the process flow 500, or other operations may be added to the process flow 500. While the UE 115-*b* and the base station 105-*b* are shown performing operations of process flow 500, any wireless device may perform the operations shown. Further, while FIG. 5 illustrates an example of communications between a UE 115-*b* and a base station 105-*b*, the techniques described herein may be applied to communications between any number of wireless devices.

The base station 105-*b* and the UE 115-*b* may communicate using one or more cells and/or component carriers, such as serving cells, primary cells, secondary cells, or some combination thereof, among other examples. During a monitoring occasion, the base station 105-*b* may transmit, to the UE 115-*b*, control information that schedules transmissions for the UE 115-*b*. The control information may be transmitted over a serving cell, which may be referred to as a scheduling serving cell, and may schedule transmissions for the serving cell or for one or more other serving cells, which may be referred to as scheduled serving cells.

At 505, the base station 105-*b* may transmit a first control information (e.g., a first DCI) over a first serving cell (e.g., a first scheduling serving cell) and a second control information (e.g., a second DCI) over a second serving cell (e.g., a second scheduling serving cell) during a first monitoring occasion (e.g., a PMO). The first and second DCI may schedule a first and second transmission (e.g., a PDSCH, an SPS release), respectively, for a third serving cell (e.g., a first scheduled serving cell). In some aspects, the third serving cell may be the first serving cell; that is, the first and second serving cells may both schedule transmissions for the first serving cell. Alternatively, the third serving cell may be different from the first serving cell and the second serving cell.

In some cases, the first and second serving cells may be the same. In some examples, the first serving cell may be a primary cell and the second serving cell may be a secondary cell. In some aspects, the first transmission may be scheduled by both the first and second DCIs transmitted over the first and second serving cells, respectively.

In some examples, the base station 105-*b* may transmit a third control information (e.g., a third DCI) over the first serving cell during the same monitoring occasion. In some cases, the third DCI schedules a third transmission for the third serving cell, while in other cases, the third DCI schedules a third transmission for a fourth serving cell (e.g., a second scheduled serving cell).

In some examples, at 510, the base station 105-*b* may transmit the third DCI during a second monitoring occasion different than the first monitoring occasion. The second monitoring occasion may occur after the first monitoring occasion.

At 515, the base station 105-*b* may transmit, and the UE 115-*b* may receive, the transmissions scheduled by the DCIs over the respective serving cells.

At 520, the UE 115-*b* may identify start times for the scheduled transmissions. For example, the UE 115-*b* may identify a first start time for the first transmission and a second start time for the second transmission.

At 525, in some examples, the UE 115-*b* may identify indexes associated with each serving cell. The UE 115-*b* may identify a first index associated with the first serving cell, a second index associated with the second cell, and a third index associated with the third serving cell. If the UE 115-*b* receives the third DCI scheduling the third transmission for the fourth serving cell, the UE 115-*b* may optionally identify a fourth index of the fourth serving cell (e.g., scheduled by the third DCI).

At 530, the UE 115-*b* may determine an order of assignment indicator values (e.g., DAI values) associated with HARQ/ACK feedback to the scheduled transmissions based on the start times identified at 520, the indexes identified at 525, the corresponding monitoring occasions, or some combination thereof. The UE 115-*b* may determine an order between a first DAI value for the first transmission and a second DAI value for the second transmission based on the start times of the respective transmissions. In some examples, a lower DAI value may correspond to an earlier start time (e.g., a transmission with an earlier start time may be ordered to be a lower in the order).

In cases where the UE 115-*b* receives a third DCI scheduling a third transmission, the UE 115-*b* may determine an order of a DAI value for the third transmission at 530 relative to other DAI values in the feedback message. In some examples, the UE 115-*b* may determine an order between the DAI values based on a start time of the third transmission, e.g., in the same manner that the UE 115-*b* orders the DAI value of the first and second transmissions. Additionally, or alternatively, the UE 115-*b* may determine an order of the DAI value based on the indexes identified at 525. For example, the UE 115-*b* may determine an order of the DAI value based on the index of the serving cell scheduled by the third DCI (e.g., the third index identified at 525) and/or the index of the serving cell scheduled by the first and second DCI (e.g., the fourth index identified at 525). The DAI values may be ordered in increasing order of the serving cell indexes, such that a lower DAI value corresponds to a lower serving cell index value.

If the third DCI is received by the UE 115-*b* in the second monitoring occasion, the UE 115-*b* may determine an order of the DAI value for the third transmission relative to the other DAIs in the feedback message based on the second monitoring occasion occurring after the monitoring occasion, for instance, where a higher DAI value corresponds to the second monitoring occasion occurring after the first monitoring occasion (and a lower DAI value of the first and/or second transmissions correspond to the first monitoring occasion occurring before the second monitoring occasion).

At 535, the UE 115-*b* may transmit, to the base station 105-*b*, feedback information for at least the first and second transmissions based on the DAI values ordered at 530. The feedback information may include a HARQ/ACK or a HARQ/NACK for each transmission. In some examples, the feedback information may be transmitted over a PUCCH.

Figure 6:
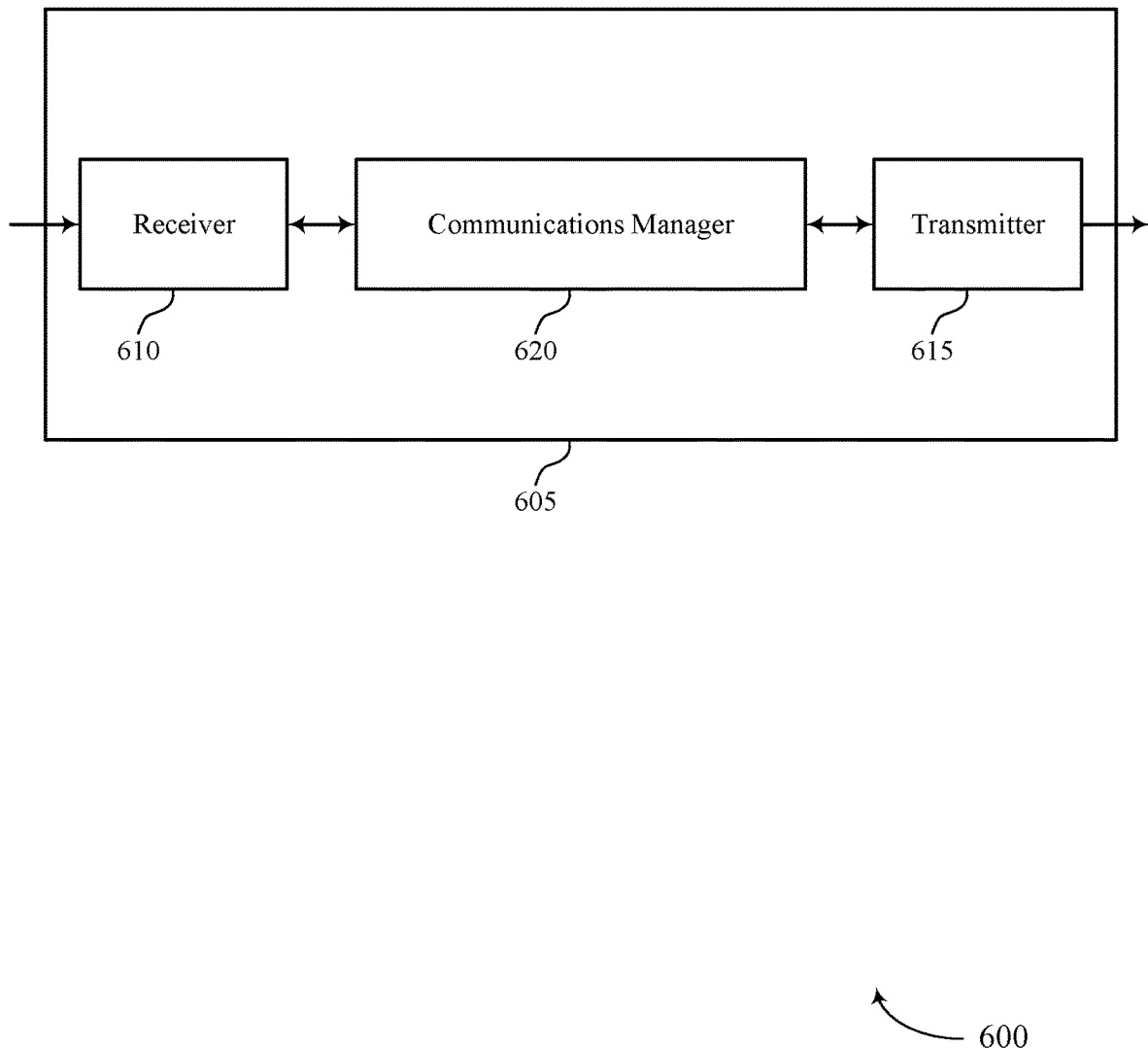
FIGS. 6 and 7 show block diagrams of devices that support assignment indexes for dynamic feedback in accordance with aspects of the present disclosure.

FIG. 6 shows a block diagram 600 of a device 605 that supports assignment indexes for dynamic feedback in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to assignment indexes for dynamic feedback). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to assignment indexes for dynamic feedback). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of assignment indexes for dynamic feedback as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission. The communications manager 620 may be configured as or otherwise support a means for identifying a first index associated with the first serving cell used to communicate the first control information and a second index associated with the second serving cell used to communicate the second control information. The communications manager 620 may be configured as or otherwise support a means for determining an order between the first assignment indicator value for the first transmission and the second assignment indicator value for the second transmission based on the first index of the first serving cell used to communicate the first control information and the second index of the second serving cell used to communicate the second control information, the first assignment indicator value and the second assignment indicator value are associated with a hybrid automatic repeat request acknowledgement feedback.

Additionally, or alternatively, the communications manager 620 may support wireless communication at a UE in accordance with examples as disclosed herein. For example, the communications manager 620 may be configured as or otherwise support a means for receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission. The communications manager 620 may be configured as or otherwise support a means for identifying a first start time for the first transmission and a second start time for the second transmission. The communications manager 620 may be configured as or otherwise support a means for determining an order between the first assignment indicator value for the first transmission and the second assignment indicator value for the second transmission based on the first start time for the first transmission and the second start time for the second transmission, where the first assignment indicator value and the second assignment indicator value are associated with a hybrid automatic repeat request acknowledgement feedback.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for assigning assignment indicator values when different scheduling cells in a same monitoring occasion schedule transmissions in a same scheduled cell. The device 605 may thus group feedback for the transmissions into a common feedback message, which may provide more efficient utilization of communication resources at the device 605.

Figure 7:
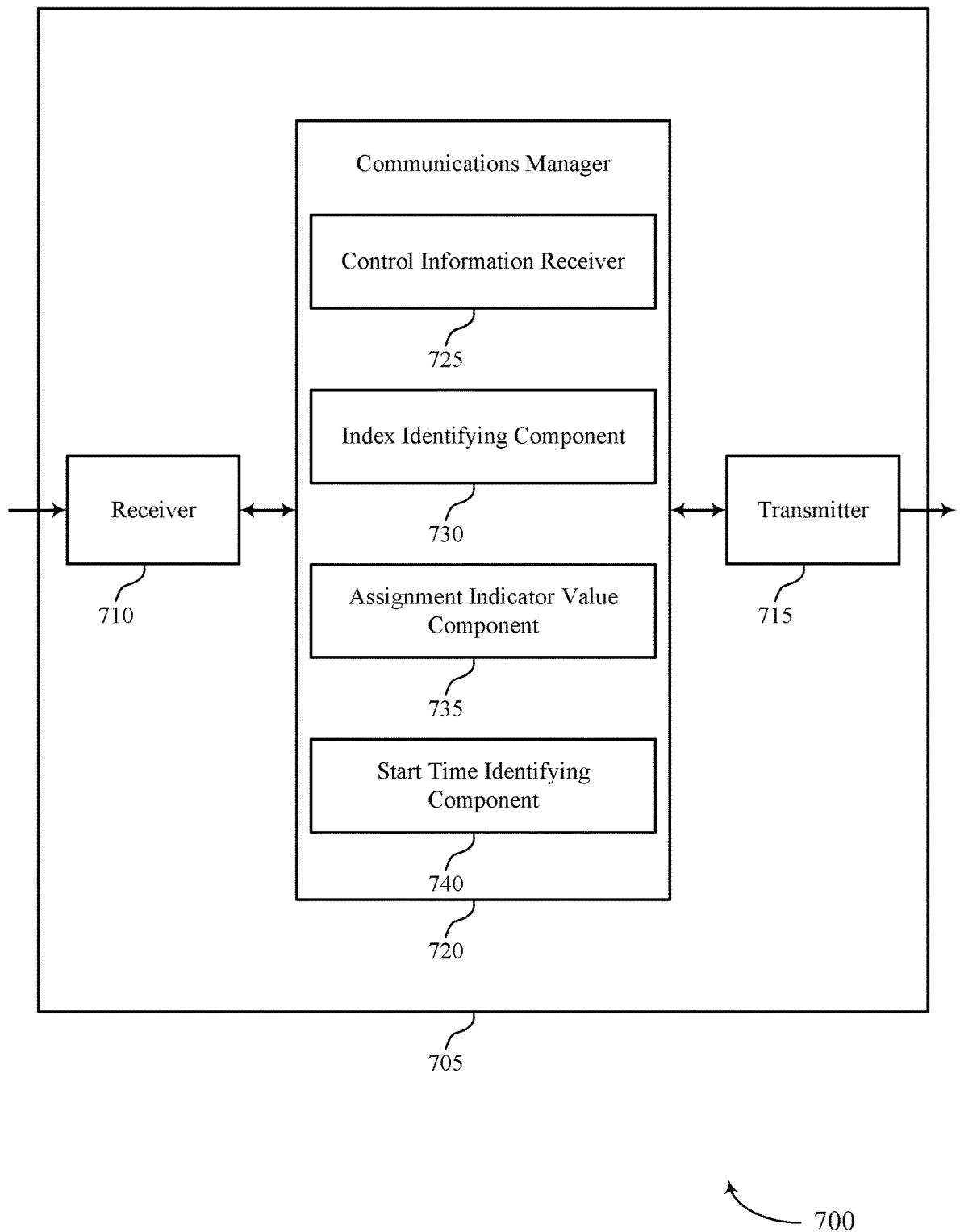

FIG. 7 shows a block diagram 700 of a device 705 that supports assignment indexes for dynamic feedback in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to assignment indexes for dynamic feedback). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to assignment indexes for dynamic feedback). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of assignment indexes for dynamic feedback as described herein. For example, the communications manager 720 may include a control information receiver 725, an index identifying component 730, an assignment indicator value component 735, a start time identifying component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The control information receiver 725 may be configured as or otherwise support a means for receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission. The index identifying component 730 may be configured as or otherwise support a means for identifying a first index associated with the first serving cell used to communicate the first control information and a second index associated with the second serving cell used to communicate the second control information. The assignment indicator value component 735 may be configured as or otherwise support a means for determining an order between the first assignment indicator value for the first transmission and the second assignment indicator value for the second transmission based on the first index of the first serving cell used to communicate the first control information and the second index of the second serving cell used to communicate the second control information, the first assignment indicator value and the second assignment indicator value are associated with a hybrid automatic repeat request acknowledgement feedback.

Additionally, or alternatively, the communications manager 720 may support wireless communication at a UE in accordance with examples as disclosed herein. The control information receiver 725 may be configured as or otherwise support a means for receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission. The start time identifying component 740 may be configured as or otherwise support a means for identifying a first start time for the first transmission and a second start time for the second transmission. The assignment indicator value component 735 may be configured as or otherwise support a means for determining an order between the first assignment indicator value for the first transmission and the second assignment indicator value for the second transmission based on the first start time for the first transmission and the second start time for the second transmission, where the first assignment indicator value and the second assignment indicator value are associated with a hybrid automatic repeat request acknowledgement feedback.

Figure 8:
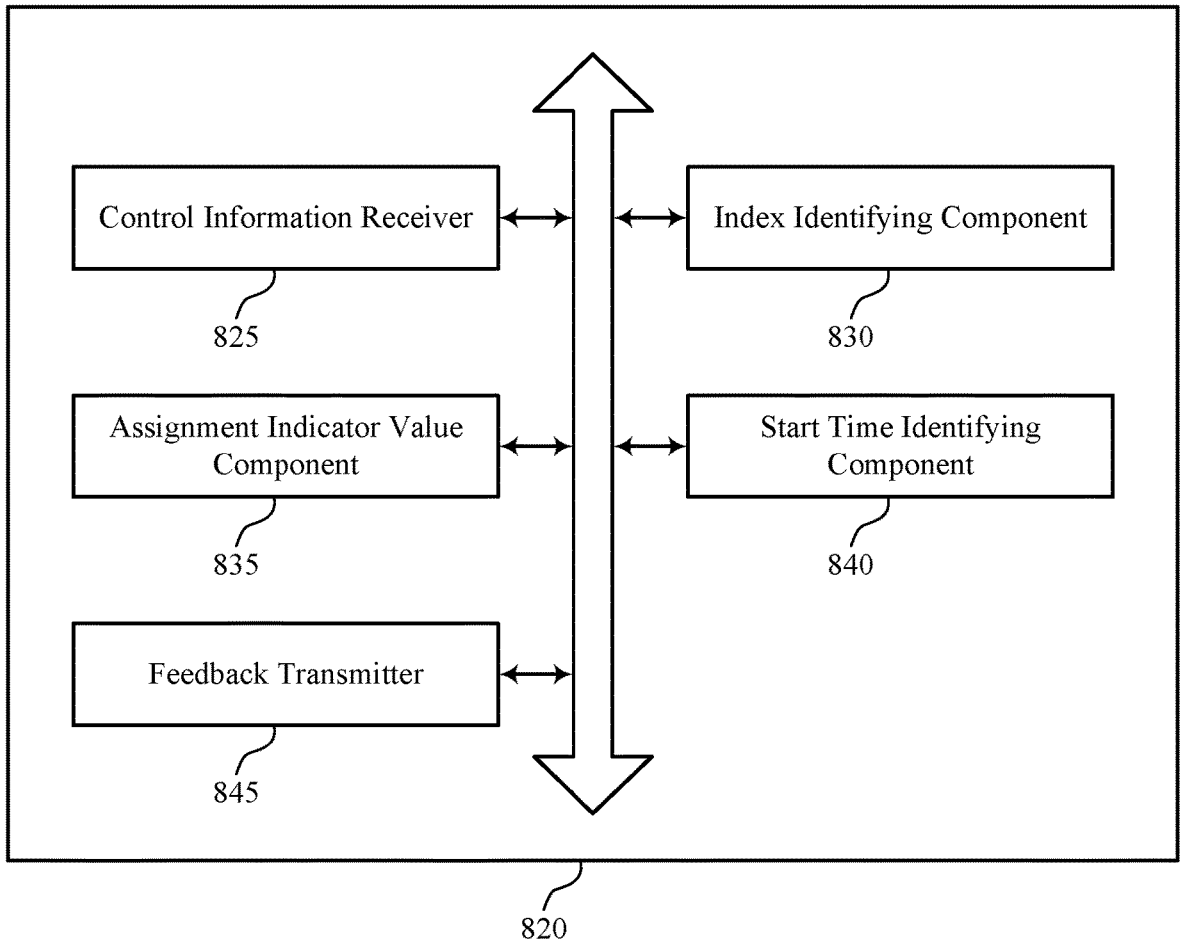
FIG. 8 shows a block diagram of a communications manager that supports assignment indexes for dynamic feedback in accordance with aspects of the present disclosure.

FIG. 8 shows a block diagram 800 of a communications manager 820 that supports assignment indexes for dynamic feedback in accordance with aspects of the present disclosure. The communications manager 820 may be an example of aspects of a communications manager 620, a communications manager 720, or both, as described herein. The communications manager 820, or various components thereof, may be an example of means for performing various aspects of assignment indexes for dynamic feedback as described herein. For example, the communications manager 820 may include a control information receiver 825, an index identifying component 830, an assignment indicator value component 835, a start time identifying component 840, a feedback transmitter 845, or any combination thereof. Each of these components may communicate, directly or indirectly, with one another (e.g., via one or more buses).

The communications manager 820 may support wireless communication at a UE in accordance with examples as disclosed herein. The control information receiver 825 may be configured as or otherwise support a means for receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission. The index identifying component 830 may be configured as or otherwise support a means for identifying a first index associated with the first serving cell used to communicate the first control information and a second index associated with the second serving cell used to communicate the second control information. The assignment indicator value component 835 may be configured as or otherwise support a means for determining an order between the first assignment indicator value for the first transmission and the second assignment indicator value for the second transmission based on the first index of the first serving cell used to communicate the first control information and the second index of the second serving cell used to communicate the second control information, the first assignment indicator value and the second assignment indicator value are associated with a hybrid automatic repeat request acknowledgement feedback.

In some examples, the control information receiver 825 may be configured as or otherwise support a means for receiving, during the monitoring occasion, a third control information over the first serving cell that schedules a third transmission for the third serving cell. In some examples, the start time identifying component 840 may be configured as or otherwise support a means for identifying a first start time for the first transmission scheduled by the first serving cell and a second start time for the third transmission scheduled by the first serving cell, where determining the order of the first assignment indicator value and the second assignment indicator value is based on the first start time and the second start time.

In some examples, the assignment indicator value component 835 may be configured as or otherwise support a means for determining the order between a third assignment indicator value for the third transmission, the first assignment indicator value, and the second assignment indicator value based on the first index of the first serving cell used to communicate the third control information, the first start time, and the second start time.

In some examples, a lower value of the first assignment indicator value and the third assignment indicator value corresponds to an earlier start time of the first start time and the second start time.

In some examples, the control information receiver 825 may be configured as or otherwise support a means for receiving, during a second monitoring occasion after the monitoring occasion, a third control information over the first serving cell that schedules a third transmission for the third serving cell. In some examples, the assignment indicator value component 835 may be configured as or otherwise support a means for determining the order between a third assignment indicator value for the third transmission, the first assignment indicator value, and the second assignment indicator value based on the second monitoring occasion occurring after the monitoring occasion.

In some examples, a lower value of the first assignment indicator value and the third assignment indicator value corresponds to the monitoring occasion occurring before the second monitoring occasion.

In some examples, the control information receiver 825 may be configured as or otherwise support a means for receiving, during the monitoring occasion, a third control information over the first serving cell that schedules a third transmission for a fourth serving cell. In some examples, the index identifying component 830 may be configured as or otherwise support a means for identifying a third index of the third serving cell scheduled by the first control information and the second control information and a fourth index of the fourth serving cell scheduled by the third control information. In some examples, the assignment indicator value component 835 may be configured as or otherwise support a means for determining the order between a third assignment indicator value for the third transmission, the first assignment indicator value, and the second assignment indicator value based on the third index and the fourth index.

In some examples, a lower value of the first assignment indicator value and the third assignment indicator value corresponds to a lower index value of the third index associated with the third serving cell and the fourth index associated with the fourth serving cell.

In some examples, the feedback transmitter 845 may be configured as or otherwise support a means for transmitting feedback information for the first transmission and the second transmission based on determining the order between the first assignment indicator value and the second assignment indicator value.

In some examples, the feedback information includes a hybrid automatic repeat request acknowledgement or a hybrid automatic repeat request negative acknowledgement for the first transmission and the second transmission.

In some examples, the feedback information is communicated over a physical uplink control channel. In some examples, the first serving cell includes a primary cell. In some examples, the second serving cell includes a secondary cell.

In some examples, the first assignment indicator value includes a value of a DAI. In some examples, a lower value of the first assignment indicator value and the second assignment indicator value corresponds to a lower index value of the first index associated with the first serving cell and the second index associated with the second serving cell.

In some examples, the first transmission or the second transmission is communicated over a physical downlink shared channel or includes a release of semi-persistent scheduling resources.

In some examples, the third serving cell scheduled by the first control information and the second control information includes the first serving cell. In some examples, the third serving cell scheduled by the first control information and the second control information is different than the first serving cell and the second serving cell.

Additionally, or alternatively, the communications manager 820 may support wireless communication at a UE in accordance with examples as disclosed herein. In some examples, the control information receiver 825 may be configured as or otherwise support a means for receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission. The start time identifying component 840 may be configured as or otherwise support a means for identifying a first start time for the first transmission and a second start time for the second transmission. In some examples, the assignment indicator value component 835 may be configured as or otherwise support a means for determining an order between the first assignment indicator value for the first transmission and the second assignment indicator value for the second transmission based on the first start time for the first transmission and the second start time for the second transmission, where the first assignment indicator value and the second assignment indicator value are associated with a hybrid automatic repeat request acknowledgement feedback.

In some examples, the first serving cell is different than the second serving cell.

In some examples, the first transmission is scheduled in the third serving cell using the first control information communicated over the first serving cell and the second control information communicated over the second serving cell that is different than the first serving cell.

In some examples, the control information receiver 825 may be configured as or otherwise support a means for receiving, during a second monitoring occasion after the monitoring occasion, a third control information over the first serving cell that schedules a third transmission for the third serving cell. In some examples, the assignment indicator value component 835 may be configured as or otherwise support a means for determining the order between a third assignment indicator value for the third transmission, the first assignment indicator value, and the second assignment indicator value based on the second monitoring occasion occurring after the monitoring occasion.

In some examples, a lower value of the first assignment indicator value and the third assignment indicator value corresponds to the monitoring occasion occurring before the second monitoring occasion.

In some examples, the control information receiver 825 may be configured as or otherwise support a means for receiving, during the monitoring occasion, a third control information over the first serving cell that schedules a third transmission for a fourth serving cell. In some examples, the index identifying component 830 may be configured as or otherwise support a means for identifying a third index of the third serving cell scheduled by the first control information and the second control information and a fourth index of the fourth serving cell scheduled by the third control information. In some examples, the assignment indicator value component 835 may be configured as or otherwise support a means for determining the order between a third assignment indicator value to the third transmission, the first assignment indicator value, and the second assignment indicator value based on the third index and the fourth index.

In some examples, a lower value of the first assignment indicator value and the third assignment indicator value corresponds to a lower index value of the third index associated with the third serving cell and the fourth index associated with the fourth serving cell.

In some examples, the feedback transmitter 845 may be configured as or otherwise support a means for transmitting feedback information for the first transmission and the second transmission based on determining the order between the first assignment indicator value and the second assignment indicator value, where the feedback information includes a hybrid automatic repeat request acknowledgement or a hybrid automatic repeat request negative acknowledgement for the first transmission and the second transmission.

In some examples, the feedback information includes a hybrid automatic repeat request acknowledgement or a hybrid automatic repeat request negative acknowledgement for the first transmission and the second transmission. In some examples, the feedback information is communicated over a physical uplink control channel.

In some examples, the first serving cell includes a primary cell. In some examples, the second serving cell includes a secondary cell.

In some examples, the first assignment indicator value includes a value of a DAI. In some examples, a lower value of the first assignment indicator value and the second assignment indicator value corresponds to an earlier start time of the first start time and the second start time.

In some examples, the first transmission or the second transmission is communicated over a physical downlink shared channel or includes a release of semi-persistent scheduling resources.

In some examples, the third serving cell scheduled by the first control information and the second control information includes the first serving cell. In some examples, the third serving cell scheduled by the first control information and the second control information is different than the first serving cell and the second serving cell.

Figure 9:
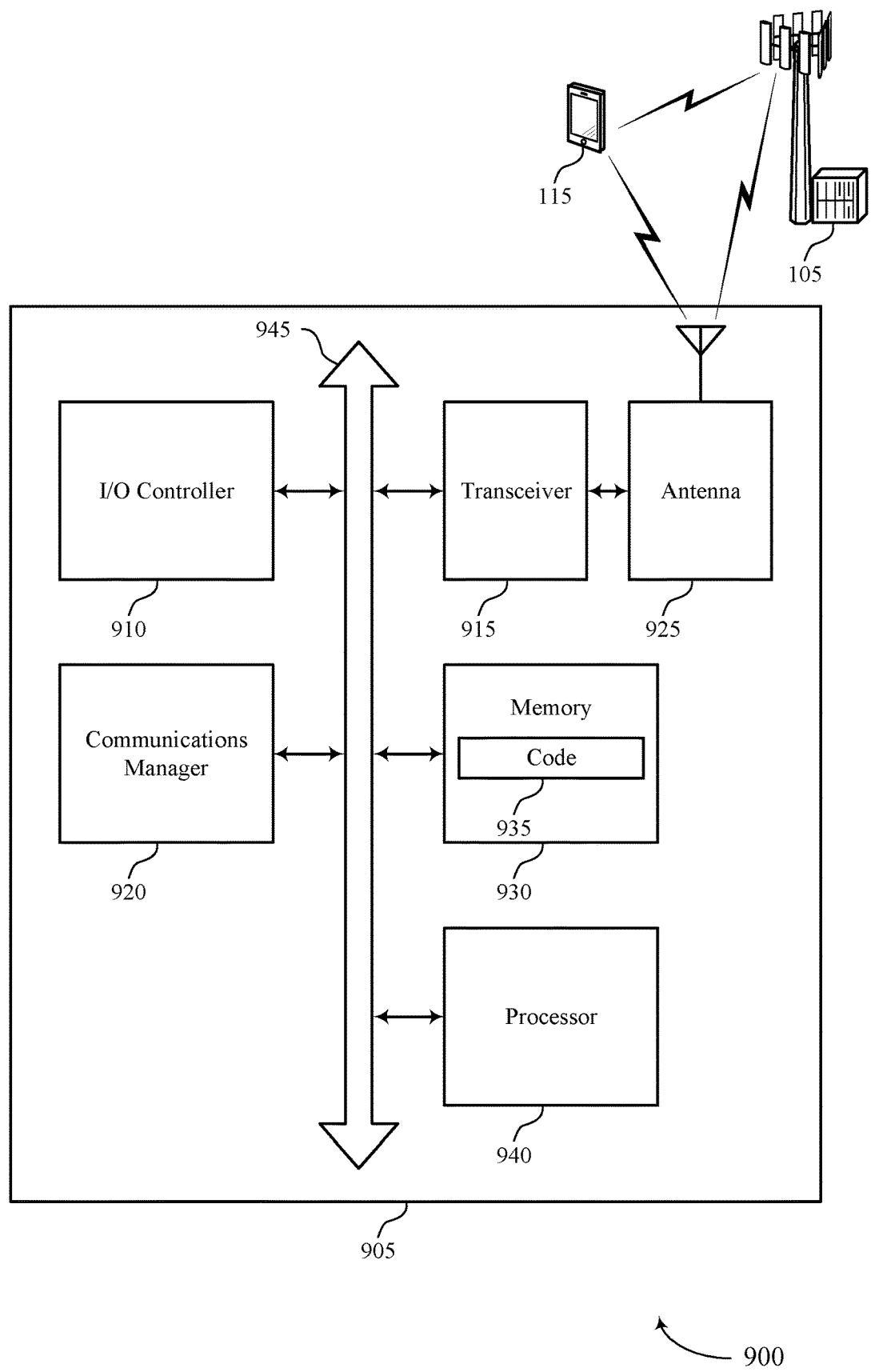
FIG. 9 shows a diagram of a system including a device that supports assignment indexes for dynamic feedback in accordance with aspects of the present disclosure.

FIG. 9 shows a diagram of a system 900 including a device 905 that supports assignment indexes for dynamic feedback in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting assignment indexes for dynamic feedback). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, during a monitoring occasion, a first control information over a first serving cell and a second control information over a second serving cell, where the first control information schedules a first transmission for a third serving cell and the second control information schedules a second transmission for the third serving cell. The communications manager 920 may be configured as or otherwise support a means for identifying a first index associated with the first serving cell used to communicate the first control information and a second index associated with the second serving cell used to communicate the second control information. The communications manager 920 may be configured as or otherwise support a means for assigning a first assignment indicator value to the first transmission and a second assignment indicator value to the second transmission based on the first index of the first serving cell used to communicate the first control information and the second index of the second serving cell used to communicate the second control information, the first assignment indicator value and the second assignment indicator value are associated with a hybrid automatic repeat request acknowledgement feedback.

Additionally, or alternatively, the communications manager 920 may support wireless communication at a UE in accordance with examples as disclosed herein. For example, the communications manager 920 may be configured as or otherwise support a means for receiving, during a monitoring occasion, a first control information over a first serving cell and a second control information over a second serving cell, where the first control information schedules a first transmission for a third serving cell and the second control information schedules a second transmission for the third serving cell. The communications manager 920 may be configured as or otherwise support a means for identifying a first start time for the first transmission and a second start time for the second transmission. The communications manager 920 may be configured as or otherwise support a means for assigning a first assignment indicator value to the first transmission and a second assignment indicator value to the second transmission based on the first start time for the first transmission and the second start time for the second transmission, where the first assignment indicator value and the second assignment indicator value are associated with a hybrid automatic repeat request acknowledgement feedback.

By including or configuring the communications manager 920 in accordance with examples as described herein, the device 905 may support techniques for assigning assignment indicator values when different scheduling cells in a same monitoring occasion schedule transmissions in a same scheduled cell. The device 905 may thus group feedback for the transmissions into a common feedback message. Grouping feedback information may reduce the number of overall feedback transmissions, thereby reducing system overhead and improving communications efficiency.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of assignment indexes for dynamic feedback as described herein, or the processor 940 and the memory 930 may be otherwise configured to perform or support such operations.

Figure 10:
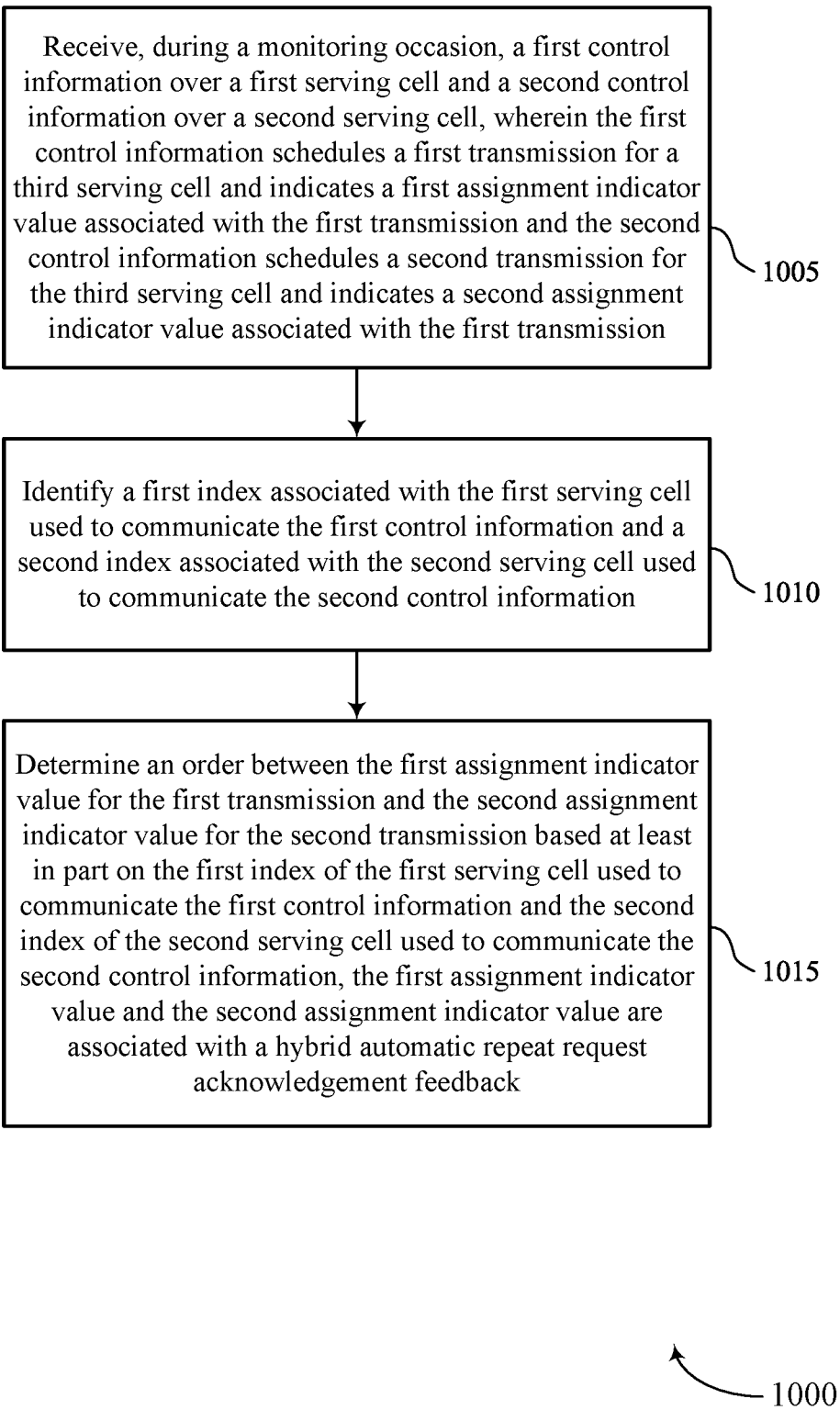
FIGS. 10 through 13 show flowcharts illustrating methods that support assignment indexes for dynamic feedback in accordance with aspects of the present disclosure.

FIG. 10 shows a flowchart illustrating a method 1000 that supports assignment indexes for dynamic feedback in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission. The operations of 1005 may be performed in accordance with examples as disclosed herein. In some examples, aspects of the operations of 1005 may be performed by a control information receiver 825 as described with reference to FIG. 8.

At 1010, the method may include identifying a first index associated with the first serving cell used to communicate the first control information and a second index associated with the second serving cell used to communicate the second control information. The operations of 1010 may be performed in accordance with examples as disclosed herein. In some examples, aspects of the operations of 1010 may be performed by an index identifying component 830 as described with reference to FIG. 8.

At 1015, the method may include determining an order between the first assignment indicator value for the first transmission and the second assignment indicator value for the second transmission based on the first index of the first serving cell used to communicate the first control information and the second index of the second serving cell used to communicate the second control information, the first assignment indicator value and the second assignment indicator value are associated with a HARQ/ACK feedback. The operations of 1015 may be performed in accordance with examples as disclosed herein. In some examples, aspects of the operations of 1015 may be performed by an assignment indicator value component 835 as described with reference to FIG. 8.

Figure 11:
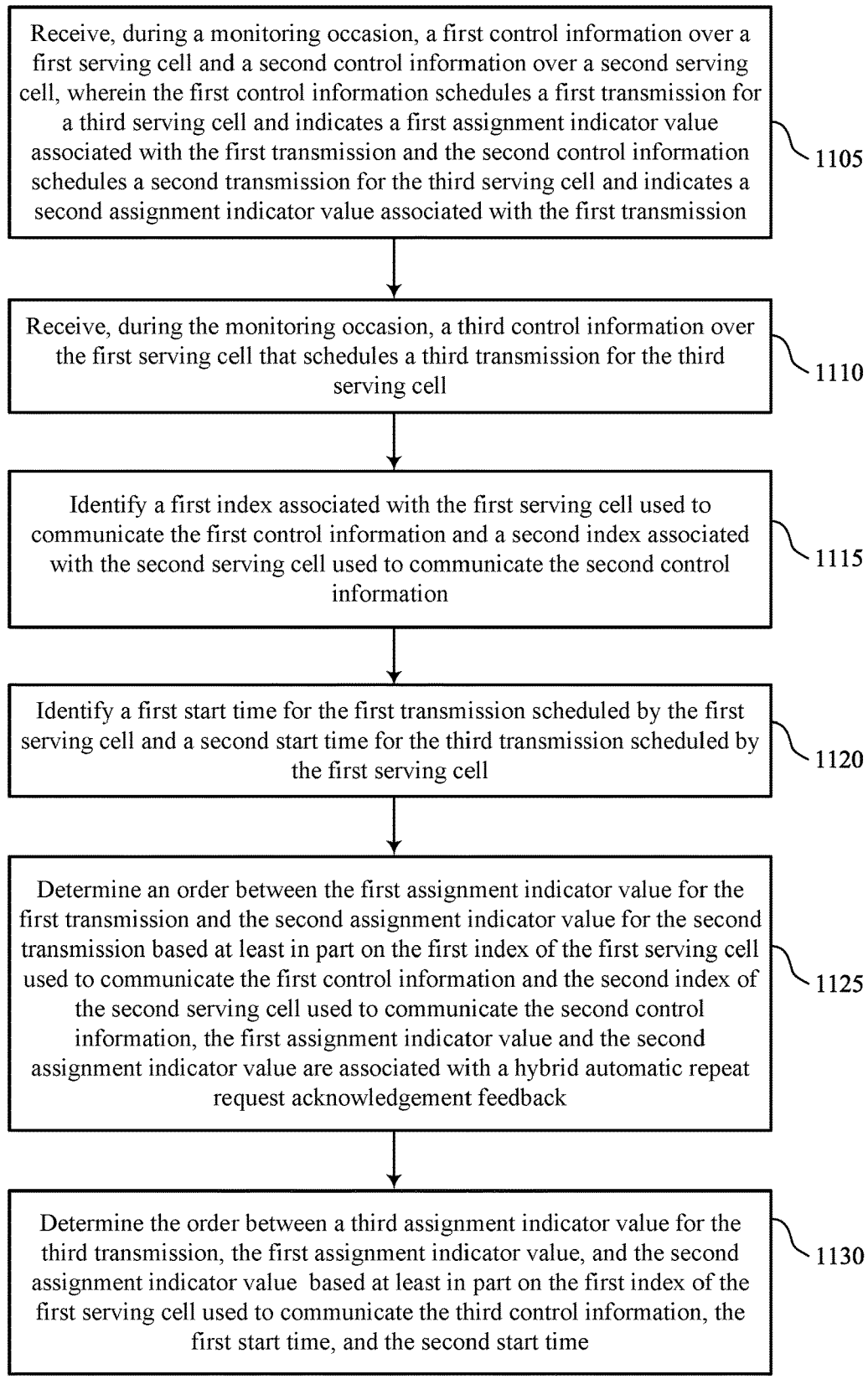

FIG. 11 shows a flowchart illustrating a method 1100 that supports assignment indexes for dynamic feedback in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission. The operations of 1105 may be performed in accordance with examples as disclosed herein. In some examples, aspects of the operations of 1105 may be performed by a control information receiver 825 as described with reference to FIG. 8.

At 1110, the method may include receiving, during the monitoring occasion, a third control information over the first serving cell that schedules a third transmission for the third serving cell. The operations of 1110 may be performed in accordance with examples as disclosed herein. In some examples, aspects of the operations of 1110 may be performed by a control information receiver 825 as described with reference to FIG. 8.

At 1115, the method may include identifying a first index associated with the first serving cell used to communicate the first control information and a second index associated with the second serving cell used to communicate the second control information. The operations of 1115 may be performed in accordance with examples as disclosed herein. In some examples, aspects of the operations of 1115 may be performed by an index identifying component 830 as described with reference to FIG. 8.

At 1120, the method may include identifying a first start time for the first transmission scheduled by the first serving cell and a second start time for the third transmission scheduled by the first serving cell. The operations of 1120 may be performed in accordance with examples as disclosed herein. In some examples, aspects of the operations of 1120 may be performed by a start time identifying component 840 as described with reference to FIG. 8.

At 1125, the method may include determining an order between the first assignment indicator value for the first transmission and the second assignment indicator value for the second transmission based on the first index of the first serving cell used to communicate the first control information and the second index of the second serving cell used to communicate the second control information, where assigning the first assignment indicator value is based on the first start time and the second start time, and where the first assignment indicator value and the second assignment indicator value are associated with a HARQ/ACK feedback. The operations of 1125 may be performed in accordance with examples as disclosed herein. In some examples, aspects of the operations of 1125 may be performed by an assignment indicator value component 835 as described with reference to FIG. 8.

At 1130, the method may include determining the order between a third assignment indicator value for the third transmission, the first assignment indicator value, and the second assignment indicator value based on the first index of the first serving cell used to communicate the third control information, the first start time, and the second start time. The operations of 1130 may be performed in accordance with examples as disclosed herein. In some examples, aspects of the operations of 1130 may be performed by an assignment indicator value component 835 as described with reference to FIG. 8.

Figure 12:
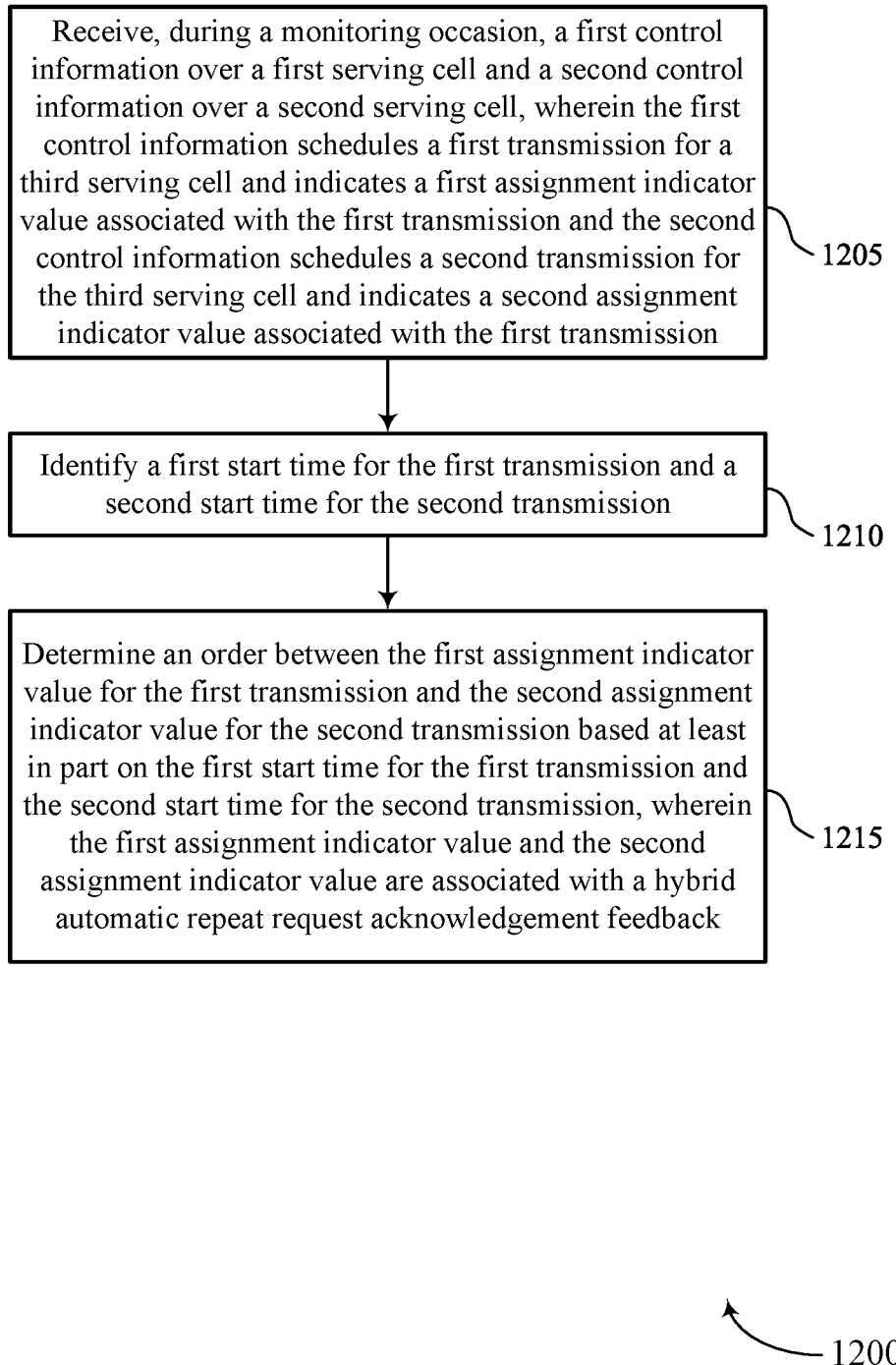

FIG. 12 shows a flowchart illustrating a method 1200 that supports assignment indexes for dynamic feedback in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission. The operations of 1205 may be performed in accordance with examples as disclosed herein. In some examples, aspects of the operations of 1205 may be performed by a control information receiver 825 as described with reference to FIG. 8.

At 1210, the method may include identifying a first start time for the first transmission and a second start time for the second transmission. The operations of 1210 may be performed in accordance with examples as disclosed herein. In some examples, aspects of the operations of 1210 may be performed by a start time identifying component 840 as described with reference to FIG. 8.

At 1215, the method may include determining an order between the first assignment indicator value for the first transmission and the second assignment indicator value for the second transmission based on the first start time for the first transmission and the second start time for the second transmission, where the first assignment indicator value and the second assignment indicator value are associated with a HARQ/ACK feedback. The operations of 1215 may be performed in accordance with examples as disclosed herein. In some examples, aspects of the operations of 1215 may be performed by an assignment indicator value component 835 as described with reference to FIG. 8.

Figure 13:
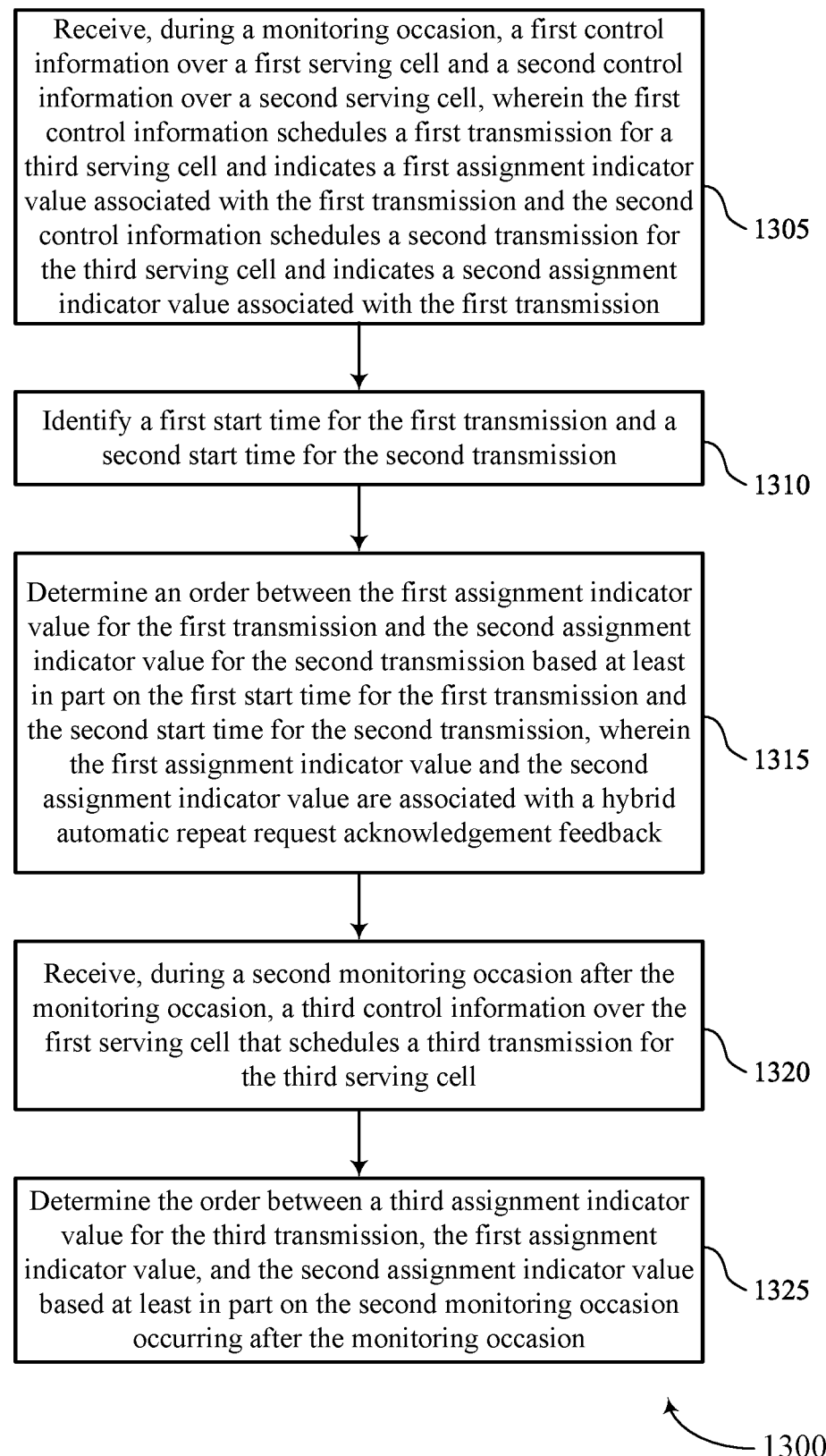

FIG. 13 shows a flowchart illustrating a method 1300 that supports assignment indexes for dynamic feedback in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include receiving, during a monitoring occasion, a first control information over a first serving cell and a second control information over a second serving cell, where the first control information schedules a first transmission for a third serving cell and indicates a first assignment indicator value associated with the first transmission and the second control information schedules a second transmission for the third serving cell and indicates a second assignment indicator value associated with the first transmission. The operations of 1305 may be performed in accordance with examples as disclosed herein. In some examples, aspects of the operations of 1305 may be performed by a control information receiver 825 as described with reference to FIG. 8.

At 1310, the method may include identifying a first start time for the first transmission and a second start time for the second transmission. The operations of 1310 may be performed in accordance with examples as disclosed herein. In some examples, aspects of the operations of 1310 may be performed by a start time identifying component 840 as described with reference to FIG. 8.

At 1315, the method may include determining an order between the first assignment indicator value for the first transmission and the second assignment indicator value for the second transmission based on the first start time for the first transmission and the second start time for the second transmission, where the first assignment indicator value and the second assignment indicator value are associated with a HARQ/ACK feedback. The operations of 1315 may be performed in accordance with examples as disclosed herein. In some examples, aspects of the operations of 1315 may be performed by an assignment indicator value component 835 as described with reference to FIG. 8.

At 1320, the method may include receiving, during a second monitoring occasion after the monitoring occasion, a third control information over the first serving cell that schedules a third transmission for the third serving cell. The operations of 1320 may be performed in accordance with examples as disclosed herein. In some examples, aspects of the operations of 1320 may be performed by a control information receiver 825 as described with reference to FIG. 8.

At 1325, the method may include determining the order between a third assignment indicator value for the third transmission, the first assignment indicator value, and the second assignment indicator value based on the second monitoring occasion occurring after the monitoring occasion. The operations of 1325 may be performed in accordance with examples as disclosed herein. In some examples, aspects of the operations of 1325 may be performed by an assignment indicator value component 835 as described with reference to FIG. 8.

The following provides an overview of aspects of the present disclosure:

Aspect 1: A method for wireless communication at a UE, comprising: receiving, during a monitoring occasion, a first control information over a first serving cell and a second control information over a second serving cell, wherein the first control information schedules a first transmission for a third serving cell and indicates a first assignment indicator value associated with the first transmission and the second control information schedules a second transmission for the third serving cell and indicates a second assignment indicator value associated with the first transmission; identifying a first index associated with the first serving cell used to communicate the first control information and a second index associated with the second serving cell used to communicate the second control information; and determining an order between the first assignment indicator value for the first transmission and the second assignment indicator value for the second transmission based at least in part on the first index of the first serving cell used to communicate the first control information and the second index of the second serving cell used to communicate the second control information, the first assignment indicator value and the second assignment indicator value are associated with a hybrid automatic repeat request acknowledgement feedback.

Aspect 2: The method of aspect 1, further comprising: receiving, during the monitoring occasion, a third control information over the first serving cell that schedules a third transmission for the third serving cell; and identifying a first start time for the first transmission scheduled by the first serving cell and a second start time for the third transmission scheduled by the first serving cell, wherein determining the order of the first assignment indicator value and the second assignment indicator value is based at least in part on the first start time and the second start time.

Aspect 3: The method of aspect 2, further comprising: determining the order between a third assignment indicator value for the third transmission, the first assignment indicator value, and the second assignment indicator value based at least in part on the first index of the first serving cell used to communicate the third control information, the first start time, and the second start time.

Aspect 4: The method of aspect 3, wherein a lower value of the first assignment indicator value and the third assignment indicator value corresponds to an earlier start time of the first start time and the second start time.

Aspect 5: The method of any of aspects 1 through 4, further comprising: receiving, during a second monitoring occasion after the monitoring occasion, a third control information over the first serving cell that schedules a third transmission for the third serving cell; and determining the order between a third assignment indicator value for the third transmission, the first assignment indicator value, and the second assignment indicator value based at least in part on the second monitoring occasion occurring after the monitoring occasion.

Aspect 6: The method of aspect 5, wherein a lower value of the first assignment indicator value and the third assignment indicator value corresponds to the monitoring occasion occurring before the second monitoring occasion.

Aspect 7: The method of any of aspects 1 through 6, further comprising: receiving, during the monitoring occasion, a third control information over the first serving cell that schedules a third transmission for a fourth serving cell; identifying a third index of the third serving cell scheduled by the first control information and the second control information and a fourth index of the fourth serving cell scheduled by the third control information; and determining the order between a third assignment indicator value for the third transmission, the first assignment indicator value, and the second assignment indicator value based at least in part on the third index and the fourth index.

Aspect 8: The method of aspect 7, wherein a lower value of the first assignment indicator value and the third assignment indicator value corresponds to a lower index value of the third index associated with the third serving cell and the fourth index associated with the fourth serving cell.

Aspect 9: The method of any of aspects 1 through 8, further comprising: transmitting feedback information for the first transmission and the second transmission based at least in part on determining the order between the first assignment indicator value and the second assignment indicator value.

Aspect 10: The method of aspect 9, wherein the feedback information comprises a hybrid automatic repeat request acknowledgement or a hybrid automatic repeat request negative acknowledgement for the first transmission and the second transmission.

Aspect 11: The method of any of aspects 9 through 10, wherein the feedback information is communicated over a physical uplink control channel.

Aspect 12: The method of any of aspects 1 through 11, wherein the first serving cell comprises a primary cell; and the second serving cell comprises a secondary cell.

Aspect 13: The method of any of aspects 1 through 12, wherein the first assignment indicator value comprises a value of a downlink assignment indicator (DAI).

Aspect 14: The method of any of aspects 1 through 13, wherein a lower value of the first assignment indicator value and the second assignment indicator value corresponds to a lower index value of the first index associated with the first serving cell and the second index associated with the second serving cell.

Aspect 15: The method of any of aspects 1 through 14, wherein the first transmission or the second transmission is communicated over a physical downlink shared channel or comprises a release of semi-persistent scheduling resources.

Aspect 16: The method of any of aspects 1 through 15, wherein the third serving cell scheduled by the first control information and the second control information comprises the first serving cell.

Aspect 17: The method of any of aspects 1 through 16, wherein the third serving cell scheduled by the first control information and the second control information is different than the first serving cell and the second serving cell.

Aspect 18: A method for wireless communication at a UE, comprising: receiving, during a monitoring occasion, a first control information over a first serving cell and a second control information over a second serving cell, wherein the first control information schedules a first transmission for a third serving cell and indicates a first assignment indicator value associated with the first transmission and the second control information schedules a second transmission for the third serving cell and indicates a second assignment indicator value associated with the first transmission; identifying a first start time for the first transmission and a second start time for the second transmission; and determining an order between the first assignment indicator value for the first transmission and the second assignment indicator value for the second transmission based at least in part on the first start time for the first transmission and the second start time for the second transmission, wherein the first assignment indicator value and the second assignment indicator value are associated with a hybrid automatic repeat request acknowledgement feedback.

Aspect 19: The method of aspect 18, wherein the first serving cell is different than the second serving cell.

Aspect 20: The method of any of aspects 18 through 19, wherein the first transmission is scheduled in the third serving cell using the first control information communicated over the first serving cell and the second control information communicated over the second serving cell that is different than the first serving cell.

Aspect 21: The method of any of aspects 18 through 20, further comprising: receiving, during a second monitoring occasion after the monitoring occasion, a third control information over the first serving cell that schedules a third transmission for the third serving cell; and determining the order between a third assignment indicator value for the third transmission, the first assignment indicator value, and the second assignment indicator value based at least in part on the second monitoring occasion occurring after the monitoring occasion.

Aspect 22: The method of aspect 21, wherein a lower value of the first assignment indicator value and the third assignment indicator value corresponds to the monitoring occasion occurring before the second monitoring occasion.

Aspect 23: The method of any of aspects 18 through 22, further comprising: receiving, during the monitoring occasion, a third control information over the first serving cell that schedules a third transmission for a fourth serving cell; identifying a third index of the third serving cell scheduled by the first control information and the second control information and a fourth index of the fourth serving cell scheduled by the third control information; and determining the order between a third assignment indicator value to the third transmission, the first assignment indicator value, and the second assignment indicator value based at least in part on the third index and the fourth index.

Aspect 24: The method of aspect 23, wherein a lower value of the first assignment indicator value and the third assignment indicator value corresponds to a lower index value of the third index associated with the third serving cell and the fourth index associated with the fourth serving cell.

Aspect 25: The method of any of aspects 18 through 24, further comprising: transmitting feedback information for the first transmission and the second transmission based at least in part on determining the order between the first assignment indicator value and the second assignment indicator value, wherein the feedback information comprises a hybrid automatic repeat request acknowledgement or a hybrid automatic repeat request negative acknowledgement for the first transmission and the second transmission.

Aspect 26: The method of aspect 25, wherein the feedback information comprises a hybrid automatic repeat request acknowledgement or a hybrid automatic repeat request negative acknowledgement for the first transmission and the second transmission.

Aspect 27: The method of any of aspects 25 through 26, wherein the feedback information is communicated over a physical uplink control channel.

Aspect 28: The method of any of aspects 18 through 27, wherein the first serving cell comprises a primary cell; and the second serving cell comprises a secondary cell.

Aspect 29: The method of any of aspects 18 through 28, wherein the first assignment indicator value comprises a value of a downlink assignment indicator (DAI).

Aspect 30: The method of any of aspects 18 through 29, wherein a lower value of the first assignment indicator value and the second assignment indicator value corresponds to an earlier start time of the first start time and the second start time.

Aspect 31: The method of any of aspects 18 through 30, wherein the first transmission or the second transmission is communicated over a physical downlink shared channel or comprises a release of semi-persistent scheduling resources.

Aspect 32: The method of any of aspects 18 through 31, wherein the third serving cell scheduled by the first control information and the second control information comprises the first serving cell.

Aspect 33: The method of any of aspects 18 through 32, wherein the third serving cell scheduled by the first control information and the second control information is different than the first serving cell and the second serving cell.

Aspect 34: An apparatus for wireless communication at a UE, comprising a processor; memory coupled with the processor; and instructions stored in the memory and executable by the processor to cause the apparatus to perform a method of any of aspects 1 through 17.

Aspect 35: An apparatus for wireless communication at a UE, comprising at least one means for performing a method of any of aspects 1 through 17.

Aspect 36: A non-transitory computer-readable medium storing code for wireless communication at a UE, the code comprising instructions executable by a processor to perform a method of any of aspects 1 through 17.

Aspect 37: An apparatus for wireless communication at a UE, comprising a processor; memory coupled with the processor; and instructions stored in the memory and executable by the processor to cause the apparatus to perform a method of any of aspects 18 through 33.

Aspect 38: An apparatus for wireless communication at a UE, comprising at least one means for performing a method of any of aspects 18 through 33.

Aspect 39: A non-transitory computer-readable medium storing code for wireless communication at a UE, the code comprising instructions executable by a processor to perform a method of any of aspects 18 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   one or more memories storing processor-executable code; and
   one or more processors coupled with the one or more memories and individually or collectively operable to execute the code to cause the UE to:
   receive, during a monitoring occasion, a first control information over a first serving cell and a second control information over a second serving cell, wherein the first control information schedules a first transmission for the first serving cell and indicates a first assignment indicator value associated with the first transmission and the second control information schedules a second transmission for the first serving cell and indicates a second assignment indicator value associated with the second transmission;
   identify a first start time for the first transmission and a second start time for the second transmission;
   determine an order between the first assignment indicator value for the first transmission and the second assignment indicator value for the second transmission based at least in part on the first start time for the first transmission and the second start time for the second transmission; and
   transmit feedback information for the first transmission and the second transmission based at least in part on determining the order between the first assignment indicator value and the second assignment indicator value, wherein the feedback information comprises a hybrid automatic repeat request acknowledgement or a hybrid automatic repeat request negative acknowledgement for the first transmission and the second transmission.

2. The UE of claim 1, wherein:
   the first serving cell comprises a primary cell;
   the second serving cell comprises a secondary cell; and
   the first assignment indicator value comprises a value of a downlink assignment indicator (DAI).

3. The UE of claim 1, wherein the first serving cell is different than the second serving cell.

4. The UE of claim 1, wherein the one or more processors are individually or collectively further operable to execute the code to cause the UE to:
   receive, during a second monitoring occasion after the monitoring occasion, a third control information over the first serving cell that schedules a third transmission for the first serving cell; and
   determine the order between a third assignment indicator value for the third transmission, the first assignment indicator value, and the second assignment indicator value based at least in part on the second monitoring occasion occurring after the monitoring occasion.

5. The UE of claim 4, wherein the first assignment indicator value having a lower value or a higher value than the third assignment indicator value is based at least in part on the monitoring occasion occurring before or after the second monitoring occasion.

6. The UE of claim 1, wherein the one or more processors are individually or collectively further operable to execute the code to cause the apparatus UE to:
   receive, during the monitoring occasion, a third control information over the first serving cell that schedules a third transmission for a third serving cell;
   identify a third index of the third serving cell scheduled by the third control information; and
   determine the order between a third assignment indicator value for the third transmission, the first assignment indicator value, and the second assignment indicator value based at least in part on the third index.

7. The UE of claim 6, wherein the first assignment indicator value having a lower value or a higher value than the third assignment indicator value is based at least in part on a lower index value of the third index associated with the first serving cell.

8. The UE of claim 1, wherein the first assignment indicator value and the second assignment indicator value are associated with the feedback information.

9. The UE of claim 1, wherein the first assignment indicator value having a lower value or a higher value than the second assignment indicator value is based at least in part on an earlier start time of the first start time or the second start time.

10. A user equipment (UE) for wireless communication, comprising:
one or more memories storing processor-executable code; and
one or more processors coupled with the one or more memories and individually or collectively operable to execute the code to cause the UE to:
receive, during a monitoring occasion, a first control information over a first serving cell and a second control information over a second serving cell, wherein the first control information schedules a first transmission for the first serving cell and indicates a first assignment indicator value associated with the first transmission and the second control information schedules a second transmission for the first serving cell and indicates a second assignment indicator value associated with the second transmission;
identify a first index associated with the first serving cell used to communicate the first control information and a second index associated with the second serving cell used to communicate the second control information;
determine an order between the first assignment indicator value for the first transmission and the second assignment indicator value for the second transmission based at least in part on the first index of the first serving cell used to communicate the first control information and the second index of the second serving cell used to communicate the second control information; and
transmit feedback information for the first transmission and the second transmission based at least in part on determining the order between the first assignment indicator value and the second assignment indicator value.

11. The UE of claim 10, wherein:
the first serving cell comprises a primary cell;
the second serving cell comprises a secondary cell; and
the first assignment indicator value comprises a value of a downlink assignment indicator (DAI).

12. The UE of claim 10, wherein the one or more processors are individually or collectively further operable to execute the code to cause the apparatus UE to:
receive, during the monitoring occasion, a third control information over the first serving cell that schedules a third transmission for the first serving cell; and
identify a first start time for the first transmission scheduled by the first serving cell and a second start time for the third transmission scheduled by the first serving cell, wherein determining the order of the first assignment indicator value and the second assignment indicator value is based at least in part on the first start time and the second start time.

13. The UE of claim 12, wherein the one or more processors are individually or collectively further operable to execute the code to cause the UE to:
determine the order between a third assignment indicator value for the third transmission, the first assignment indicator value, and the second assignment indicator value based at least in part on the first index of the first serving cell used to communicate the third control information, the first start time, and the second start time.

14. The UE of claim 13, wherein the first assignment indicator value having a lower value or a higher value than the third assignment indicator value is based at least in part on an earlier or later start time of the first start time and the second start time.

15. The UE of claim 10, wherein the one or more processors are individually or collectively further operable to execute the code to cause the UE to:
receive, during a second monitoring occasion after the monitoring occasion, a third control information over the first serving cell that schedules a third transmission for the first serving cell; and
determine the order between a third assignment indicator value for the third transmission, the first assignment indicator value, and the second assignment indicator value based at least in part on the second monitoring occasion occurring after the monitoring occasion.

16. The UE of claim 15, wherein the first assignment indicator value having a lower value or a higher value than the third assignment indicator value is based at least in part on the monitoring occasion occurring before or after the second monitoring occasion.

17. The UE of claim 10, wherein the one or more processors are individually or collectively further operable to execute the code to cause the UE to:
receive, during the monitoring occasion, a third control information over the first serving cell that schedules a third transmission for a third serving cell;
identify a third index of the third serving cell scheduled by the third control information; and
determine the order between a third assignment indicator value for the third transmission, the first assignment indicator value, and the second assignment indicator value based at least in part on the third index.

18. The UE of claim 17, wherein the first assignment indicator value having a lower value or a higher value than the third assignment indicator value is based at least in part on a lower index value of the third index associated with the third serving cell.

19. The UE of claim 10, wherein the first assignment indicator value and the second assignment indicator value are associated with a hybrid automatic repeat request acknowledgement feedback.

20. The UE of claim 10, wherein the feedback information comprises a hybrid automatic repeat request acknowledgement or a hybrid automatic repeat request negative acknowledgement for the first transmission and the second transmission.

21. The UE of claim 10, wherein the feedback information is communicated over a physical uplink control channel.

22. The UE of claim 10, wherein the first assignment indicator value having a lower value or a higher value than the second assignment indicator value is based at least in part on a lower index value of the first index associated with the first serving cell or the second index associated with the second serving cell.

23. The UE of claim 10, wherein the first transmission or the second transmission is communicated over a physical downlink shared channel or comprises a release of semi-persistent scheduling resources.

24. A method for wireless communication at a user equipment (UE), comprising:
receiving, during a monitoring occasion, a first control information over a first serving cell and a second control information over a second serving cell, wherein the first control information schedules a first transmission for the first serving cell and indicates a first assignment indicator value associated with the first transmission and the second control information schedules a second transmission for the first serving cell and indicates a second assignment indicator value associated with the second transmission;

identifying a first start time for the first transmission and a second start time for the second transmission;

determining an order between the first assignment indicator value for the first transmission and the second assignment indicator value for the second transmission based at least in part on the first start time for the first transmission and the second start time for the second transmission; and transmitting feedback information for the first transmission and the second transmission based at least in part on determining the order between the first assignment indicator value and the second assignment indicator value, wherein the feedback information comprises a hybrid automatic repeat request acknowledgement or a hybrid automatic repeat request negative acknowledgement for the first transmission and the second transmission.

25. The method of claim 24, wherein:
the first serving cell comprises a primary cell;
the second serving cell comprises a secondary cell; and
the first assignment indicator value comprises a value of a downlink assignment indicator (DAI).

26. The method of claim 24, wherein the first serving cell is different than the second serving cell.

27. A method for wireless communication at a user equipment (UE), comprising:
receiving, during a monitoring occasion, a first control information over a first serving cell and a second control information over a second serving cell, wherein the first control information schedules a first transmission for the first serving cell and indicates a first assignment indicator value associated with the first transmission and the second control information schedules a second transmission for the first serving cell and indicates a second assignment indicator value associated with the second transmission;

identifying a first index associated with the first serving cell used to communicate the first control information and a second index associated with the second serving cell used to communicate the second control information;

determining an order between the first assignment indicator value for the first transmission and the second assignment indicator value for the second transmission based at least in part on the first index of the first serving cell used to communicate the first control information and the second index of the second serving cell used to communicate the second control information; and transmitting feedback information for the first transmission and the second transmission based at least in part on determining the order between the first assignment indicator value and the second assignment indicator value.

28. The method of claim 27, wherein:
the first serving cell comprises a primary cell;
the second serving cell comprises a secondary cell; and
the first assignment indicator value comprises a value of a downlink assignment indicator (DAI).

* * * * *